United States Patent
Asai et al.

(10) Patent No.: US 12,184,452 B2
(45) Date of Patent: Dec. 31, 2024

(54) COMMUNICATION DEVICE AND COMMUNICATION METHOD

(71) Applicant: TOYOTA JIDOSHA KABUSHIKI KAISHA, Toyota (JP)

(72) Inventors: Hirochika Asai, Tokyo-to (JP); Yusuke Doi, Tokyo-to (JP); Masahiro Ishiyama, Tokyo-to (JP); Ryokichi Onishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/875,688

(22) Filed: Jul. 28, 2022

(65) Prior Publication Data

US 2022/0368565 A1 Nov. 17, 2022

Related U.S. Application Data

(63) Continuation of application No. PCT/JP2021/002248, filed on Jan. 22, 2021.

(30) Foreign Application Priority Data

Jan. 30, 2020 (JP) .................. 2020-014072

(51) Int. Cl.
*H04L 12/54* (2022.01)
*H04L 65/401* (2022.01)
*H04L 12/70* (2013.01)

(52) U.S. Cl.
CPC ........ *H04L 12/5601* (2013.01); *H04L 65/401* (2022.05); *H04L 2012/5603* (2013.01)

(58) Field of Classification Search
CPC ............... H04L 12/5601; H04L 65/401; H04L 2012/5603
See application file for complete search history.

(56) References Cited

U.S. PATENT DOCUMENTS 6,587,441 B1 * 7/2003 Urban .................. H04L 1/1867
370/395.51
8,184,529 B2 5/2012 Amano
(Continued)

FOREIGN PATENT DOCUMENTS

| JP | 2010-119098 A | 5/2010 |
| JP | 2015-133648 A | 7/2015 |

(Continued)

OTHER PUBLICATIONS

Requirements for Internet Host-Communication Layers, https://tools.ietf.org/html/rfc1122, (Jan. 27, 2020 version).
(Continued)

*Primary Examiner* — Nicholas R Taylor
*Assistant Examiner* — Angela Widhalm De Rodriguez
(74) *Attorney, Agent, or Firm* — Finnegan, Henderson, Farabow, Garrett, and Dunner, LLP

(57) ABSTRACT

According to one embodiment, a communication device includes: acquisition circuitry including a plurality of data acquirers configured to acquire data for transmission; processing circuitry configured to determine consecutive first sequence numbers for a plurality of pieces of the data acquired by the plurality of data acquirers, and to generate a plurality of packets that include the data acquired by the plurality of data acquirers and the first sequence numbers determined for the plurality of pieces of the data; and transmitting circuitry configured to transmit the plurality of packets wherein the packet includes an identifier that identifies the data acquirer having acquired the data in the packet or an identifier that identifies an application corresponding to the data in the packet.

18 Claims, 13 Drawing Sheets

(56) References Cited

U.S. PATENT DOCUMENTS

| | | | |
|---|---|---|---|
| 10,187,165 B2 | 1/2019 | Mashimo et al. | |
| 10,701,188 B2 | 6/2020 | Kameyama et al. | |
| 11,888,619 B2* | 1/2024 | Pradas | H04L 1/08 |
| 2001/0055311 A1* | 12/2001 | Trachewsky | H04L 1/0003 |
| | | | 370/445 |
| 2005/0039075 A1* | 2/2005 | Igarashi | H04L 69/00 |
| | | | 714/18 |
| 2010/0097960 A1 | 4/2010 | Amano | |
| 2013/0003553 A1* | 1/2013 | Samuels | H04L 67/56 |
| | | | 370/235 |
| 2015/0349930 A1* | 12/2015 | Sazawa | H04L 43/16 |
| | | | 370/254 |
| 2017/0359131 A1 | 12/2017 | Mashimo et al. | |
| 2018/0124843 A1* | 5/2018 | Shaheen | H04W 76/11 |
| 2018/0146073 A1 | 5/2018 | Kameyama et al. | |
| 2019/0239112 A1* | 8/2019 | Rao | H04W 72/20 |
| 2019/0306745 A1* | 10/2019 | Kim | H04W 28/0278 |

FOREIGN PATENT DOCUMENTS

| | | |
|---|---|---|
| JP | 2015-201687 A | 11/2015 |
| JP | 2017-011534 A | 1/2017 |
| JP | 2017-224875 A | 12/2017 |
| WO | WO 2016/181461 A1 | 11/2016 |
| WO | WO 2019/189681 A1 | 10/2019 |

OTHER PUBLICATIONS

Adam Langley et al., "The QUIC Transport Protocol: Design and Internet-Scale Deployment", SIGCOMM' 17, 2017.

NTT Docomo Technical Journal, vol. 26, No. 1, Apr. 2018 with machine translation.

Ns-3, https://www.nsnam.org, retrieval date: Jul. 20, 2022.

QUIC: A UDP-Based Multiplexed and Secure Transport, https://tools.ietf.org/html/draft-ietf-quic-transport-23 (Jan. 22, 2020 version).

Neal Cardwell et al., "BBR:Congestion-Based Congestion Control " Communications of the ACM, vol. 60, No. 2, 2017.

Datagram Transport Layer Security Version 1.2, https://tools.ietf.org/html/rfc6347, (Jan. 23, 2020 version).

Using HMAC-SHA-256, HMAC-SHA-384, and HMAC-SHA-512 with IPsec, https://tools.ietf.org/html/rfc4868, (Jan. 24, 2020 version).

Advice to link designers on link Automatic Repeat reQuest (ARQ), https://tools.ietf.org/html/rfc3366#section-1.1, (Jan. 25, 2020 version).

Forward Error Correction (FEC) Framework, https://tools.ietf.org/html/rfc6363, (Jan. 25, 2020 version).

Transmission Control Protocol, https://tools.ietf.org/html/rfc793, (Jan. 27, 2020 version).

* cited by examiner

| ETHERNET HEADER | IP HEADER | UDP HEADER | DTLS Record HEADER | DTLS HMAC | DFMP HEADER | DFCP HEADER | PAYLOAD PORTION | ETHERNET FCS |

FIG. 5

COMMUNICATION DEVICE AND COMMUNICATION METHOD

CROSS REFERENCE TO RELATED APPLICATIONS

This application is a Continuation of International Application No. PCT/JP2021/002248, filed on Jan. 22, 2021, the entire contents of which is hereby incorporated by reference.

FIELD

Embodiments described herein relate to a communication device and a communication method.

BACKGROUND

For realizing a safe, comfortable and efficient traveling of an automobile and an automatic driving, it is essential to collect data from various sensors included in the automobile. For example, the collected data is used for remotely monitoring the traveling situation of an automatic driving vehicle. Further, a use example in which a high definition map (HD Map) to be used for the automatic driving and the like is generated from a camera picture is in discussion. Furthermore, there is a V2C2V (Vehicle-to-Cloud-to-Vehicle) application that detects an abnormal change or danger on a road by processing the collected data and that notifies the abnormity to another automobile.

In this way, it is important to collect data from the automobile. Meanwhile, there are a variety of applications that use the data, and the timing when the collected data is actually needed varies greatly depending on the application. In a best-effort communication principle that is generally used in the present internet, when congestion occurs due to the transfer of large-volume data having a loose time constraint, as exemplified by a camera picture for the HD map, a data transfer having a severe time constraint, as exemplified by remote monitoring, can be influenced. For example, there are influences such as increase in communication delay due to retransmission or queuing and a data disappearance due to packet loss.

BRIEF DESCRIPTION OF THE DRAWINGS

FIG. 5 is a diagram showing an exemplary format of a data link layer packet;

DETAILED DESCRIPTION

Figure 1:
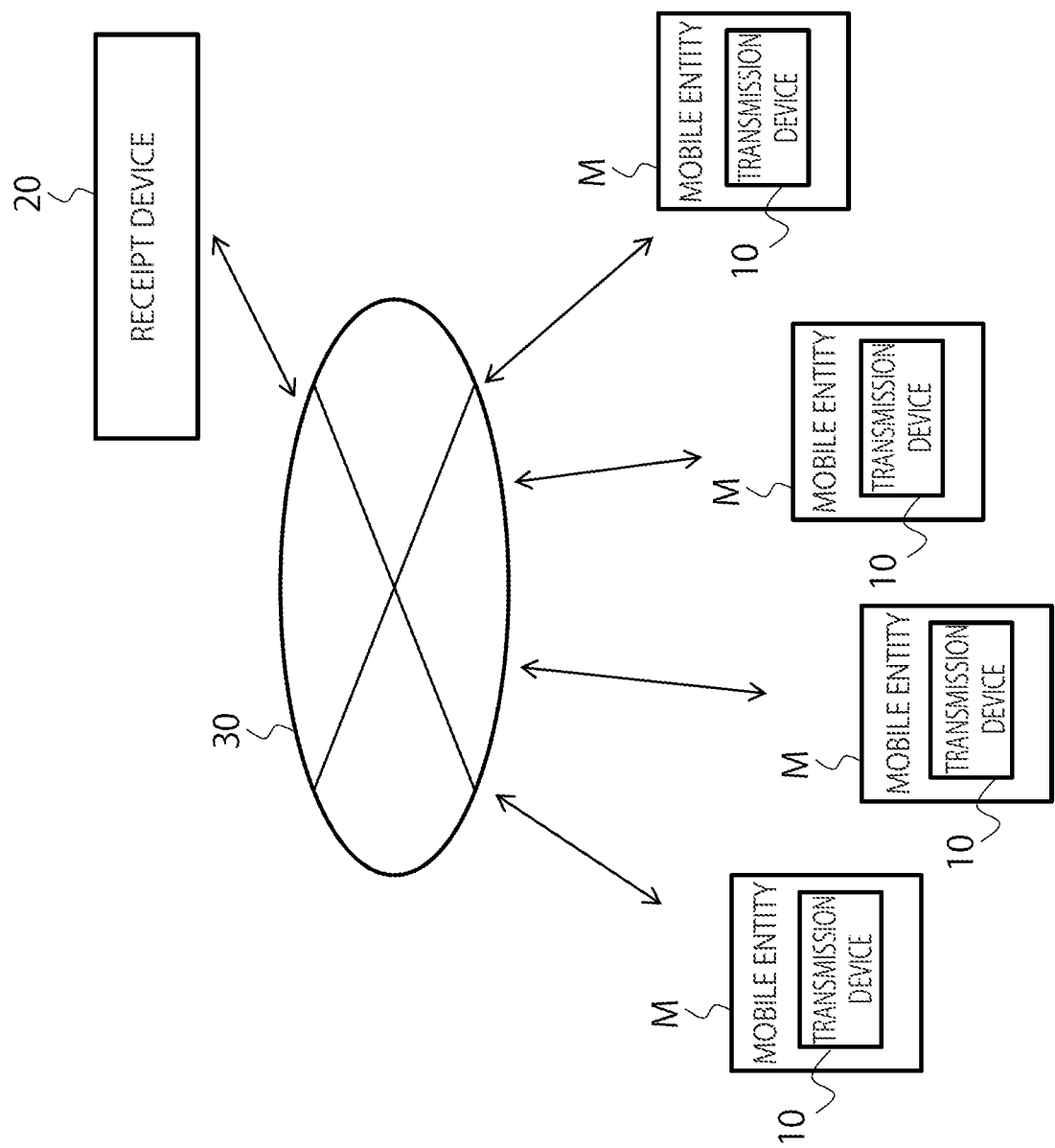
FIG. 1 is a block diagram of a data transmission system according to a first embodiment.

According to one embodiment, a communication device includes: acquisition circuitry including a plurality of data acquirers configured to acquire data for transmission; processing circuitry configured to determine consecutive first sequence numbers for a plurality of pieces of the data acquired by the plurality of data acquirers, and to generate a plurality of packets that include the data acquired by the plurality of data acquirers and the first sequence numbers determined for the plurality of pieces of the data; and transmitting circuitry configured to transmit the plurality of packets wherein the packet includes an identifier that identifies the data acquirer having acquired the data in the packet or an identifier that identifies an application corresponding to the data in the packet.

Embodiments of the present disclosure will be described below with reference to the drawings. The drawings schematically show the embodiments of the present disclosure as an example, and the embodiments of the present disclosure are not limited to configurations disclosed in the drawings.

First Embodiment

FIG. 1 is a block diagram of a data transmission system according to the embodiment. The data transmission system in FIG. 1 includes a plurality of mobile entities M each of which is equipped with a transmission device 10, and a receipt device 20. Each of the transmission device 10 and the receipt device 20 corresponds to an example of a communication device or wireless communication device according to the embodiment.

The mobile entity M is any mobile entity such as an automobile, a robot, a boat, a drone, a mobile terminal (a smartphone, a tablet terminal and the like) or a train. In the embodiment, the transmission device 10 is mounted on the mobile entity. However, the transmission device 10 may be mounted on a terminal or machine that is fixedly installed. In the embodiment, it is assumed that the mobile entity M is an automobile. For example, the automobile is an automobile that has a function of assisting user's driving or an automatic driving vehicle that travels with autonomous determination.

The transmission device 10 of the mobile entity M is connected with a communication network 30. As an example, the communication network 30 is a mobile network, a wireless LAN (Local Area Network) or the like. Examples of the mobile network include a 3G network, an LTE network, and a next-generation (5G) network. The kind of the network does not matter. The communication network 30 is not limited to a wireless network and may be a wired network. The communication network 30 may include a plurality of kinds of networks. In this case, the transmission device 10 may select the network to be used for communication, from the plurality of kinds of networks. The transmission device 10 performs wireless communication in the embodiment but may be configured to perform wired communication.

The transmission device 10 acquires data from a plurality of sensors provided in the mobile entity M. The plurality of sensors detects data that is provided to a plurality of applications. The transmission device 10 generates a packet including data for each application and transmits the generated packet to the receipt device 20. Examples of the plurality of sensors include a camera, a GPS, a detection sensor (a LiDAR (Light Detecting And Ranging), a speed sensor, an acceleration sensor, and the like) for traveling information, a detection sensor for control data (engine rotation state, accelerator stepping state and the like) about the automobile, a detection sensor for sudden braking, and a detection sensor for an obstacle (a fallen object and a forward vehicle). Data that is output from each sensor intermittently or at particular timings forms one data flow individually.

The receipt device 20 is connected with the communication network 30. As an example, the receipt device 20 is disposed in a mobile network, and the receipt device 20 may be an edge controller in the mobile network. The receipt device 20 receives a plurality of packets including data to a plurality of applications, from the mobile entity M. The receipt device 20 includes a plurality of applications that processes the data received from the mobile entity M. The receipt device 20 acquires the data from the packet received from the mobile entity M and passes the acquired data to an application corresponding to the data. Examples of the plurality of applications include an application for generating a high definition map, an application for generating an optimization model for engine control, and an application for generating road safety information. As an example, each of the application for generating a high definition map and the application for generating an optimization model for engine control has a loose time constraint for data transmission (1 minute, 1 hour, 1 day or the like), and the application for generating road safety information has a tight time constraint for data transmission (for example, 10 seconds or less). The information of the time constraint for transmission may be previously shared between the transmission device 10 and the receipt device 20.

In the case where the receipt device 20 functions as a relay device, the receipt device 20 does not need to include the plurality of applications. In this case, the receipt device 20 as the relay device transmits the data received from the transmission device 10 of the mobile entity M, to another server including the plurality of applications.

As an example, the transmission device 10 of the mobile entity M and the receipt device 20 communicate through a base station. In this case, the transmission device 10 is wirelessly connected with a base station in the vicinity, by executing a predetermined connection process. The transmission device 10 of the mobile entity M communicates with the receipt device 20 through the connected base station. The receipt device 20 is connected with the base station wirelessly or by wire. The receipt device 20 may be connected with a plurality of base stations or may be connected with the base station on a one-to-one basis. One or more packet relay devices including the base station may exist on a channel between the transmission device 10 and the receipt device 20.

In the embodiment, in the case where the receipt device 20 acquires, from the mobile entity M, the data for applications having various time constraints, a mechanism in which the data is transmitted from the mobile entity M such that the time constraints of the applications are satisfied is realized. In the embodiment, a protocol (data flow management protocol (DFMP)) for data flow management and a protocol (data flow control protocol (DFCP)) for data flow control are introduced as protocol by which the transmission device 10 of the mobile entity M transmits the data for the plurality of applications acquired from the plurality of sensors, to the receipt device 20, not as separate data flows but as an identical data flow. The DFMP is a lower layer of the DFCP.

In a process for the DFCP, to the data for each application, a DFCP header including a particular ID (referred to as a flow ID) specific to the application is added, so that a DFCP packet is obtained. Then, for the DFCP packets for the plurality of applications, consecutive sequence numbers (referred to as global sequence numbers) are determined depending on the transmission order of the DFCP packets. A DFMP header including the determined sequence number is added to the DFCP packet, so that a DFMP packet is obtained. That is, for the DFMP, sequence numbers are not separately assigned to applications, and consecutive sequence numbers (global sequence numbers) are assigned to DFCP packets for a plurality of applications, depending on the transmission order of the DFCP packets. Further, the DFMP header may include the transmission time (time stamp) of the DFMP packet.

The receipt device 20 receives the DFMP packet transmitted from the transmission device 10 and detects the loss of the packet based on the global sequence number included in the DFMP header. The packet loss includes not only a bit error or packet disappearance due to electromagnetic noises but also a packet disappearance caused by the overflow from a buffer of a packet relay device when the packet is transferred by an intermediate device. Further, the receipt device 20 detects the fluctuation of the delay time of the packet arrival, based on the difference between the time stamp of the DFMP header and the receipt time of the DFMP packet. Based on the detection results, the receipt device 20 transmits information concerning the receipt quality of the packet, to the transmission device 10, as feedback information. Further, the receipt device 20 acquires the DFCP packet by removing the DFMP header from the DFMP packet, and passes the data included in the payload of the DFCP packet, to the application corresponding to the flow ID of the DFCP header.

The transmission device 10 performs the transmission control of the data for each application, based on the feedback information and the time constraint of the application. As an example, in the case where the packet loss rate is a threshold or higher, the transmission device 10 gives redundancy to the data (event data about sudden braking, or the like) for the application having a tight time constraint, or preferentially transmits the data for the application having a tight time constraint. Examples of the transmission of the data with redundancy include the transmission of the same data with a plurality of DFCP packets and the transmission of the plurality of DFCP packets using separate channels (for example, 5G and LTE). Thereby, even when one piece of the plurality of pieces of data disappears, another piece of data reaches the receipt device 20. Therefore, it is possible to increase the possibility that the data having a tight rime constraint reliably reaches the receipt device 20. Further, examples of the preferential transmission of the data having a tight time constraint includes the decrease in the transmission rate of the data (picture data or the like) for the application having a loose time constraint. Thereby, the number of packets that are transmitted through the channel decreases, and therefore it is possible to expect the decrease in packet loss. In this way, the data for the plurality of applications is managed as an identical data flow. Thereby, the data transmissions for the applications are individually controlled, and both time constraints of the application having a tight time constraint and the application having a loose time constraint are satisfied. Details of the data transmission system according to the embodiment will be described below.

Figure 2:
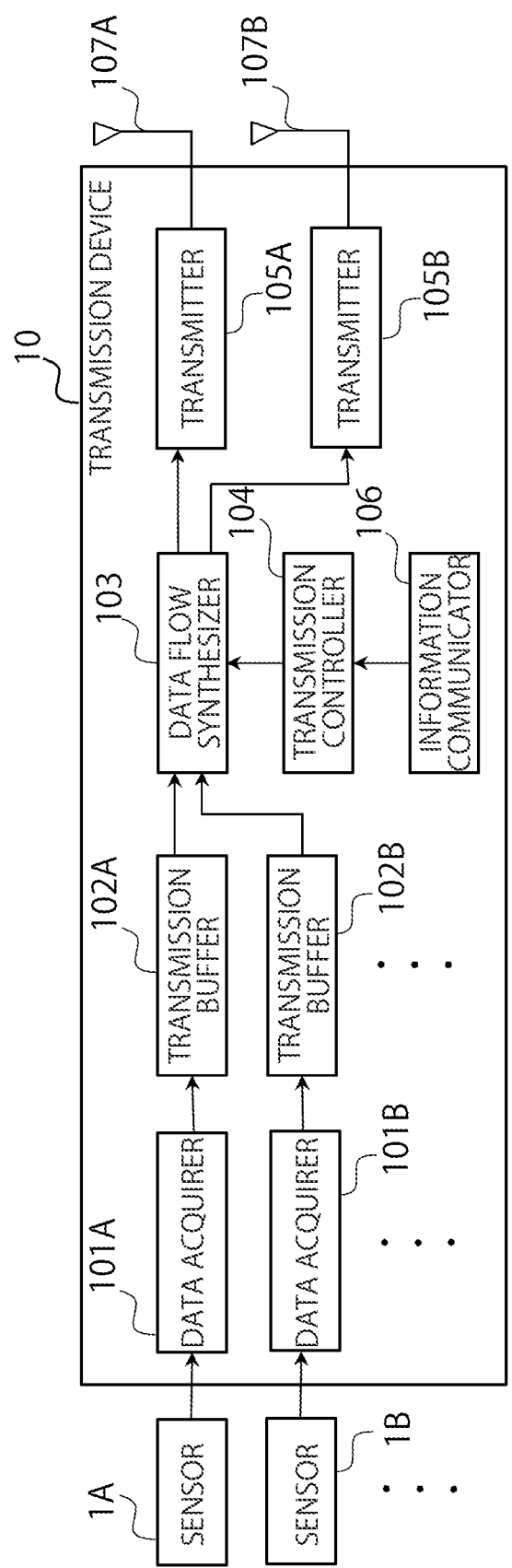
FIG. 2 is a block diagram of a transmission device according to the first embodiment.

FIG. 2 is a block diagram of the transmission device 10. The transmission device 10 corresponds to an example of the communication device or wireless communication device according to the embodiment.

The transmission device 10 includes a plurality of data acquirers 101A, 101B, a plurality of transmission buffers 102A, 102B, a data flow synthesizer (packet generator) 103, a transmission controller 104, transmitters 105A, 105B, information communicator 106 and antennas 107A, 107B.

The number of data acquirers is two in the example of FIG. 2 but may be three or more. Similarly, the number of transmission buffers is two, but may be three or more. The number of transmitters is two, but may be one, or three or more.

When being not particularly distinguished, the data acquirers 101A, 101B are referred to as a data acquirer 101. When being not particularly distinguished, the transmission buffers 102A, 102B are referred to as a transmission buffer 102. When being not particularly distinguished, the transmitters 105A, 105B are referred to as a transmitter 105. When being not particularly distinguished, the antennas 107A, 107B are referred to as an antenna 107.

The data acquirers 101A, 101B are connected with sensors 1A, 1B, respectively. The sensor 1A outputs the data that is provided to an application A. The sensor 1B outputs the data that is provided to an application B. The number of sensors is two in the example of FIG. 2 but may be three or more. When being not particularly distinguished, the sensors 1A, 1B are referred to as a sensor 1.

Examples of the plurality of sensors include a camera, a GPS, a detection sensor (a LiDAR (Light Detecting And Ranging), a speed sensor, an acceleration sensor, and the like) for traveling information, a detection sensor for control data (engine rotation state, accelerator stepping state and the like) about the automobile, a detection sensor for sudden braking, and a detection sensor for an obstacle (a fallen object and a forward vehicle). The sensor may output data at a regular time interval, or may output data at a particular timing, as exemplified by a timing when an event occurs. The example of the sensor is not limited to the above examples. For example, the sensor may be a sensor that detects data input through an operation device by a user such as an occupant of the automobile.

Each data that is output from each sensor at a regular interval or at a particular timing becomes one data flow.

The data acquirers 101A, 101B acquire the data detected by the sensors 1A, 1B. The data acquirers 101A, 101B provide the acquired data to the transmission buffers 102A, 102B. Examples of the data detected by the sensor include attribute information of the sensor, a detection time and a data body.

The data acquirer 101 may perform a predetermined computation (for example, the calculation of an average) to the data acquired from the sensor 1, and may provide the data after the computation, to the transmission buffer 102. Further, the data acquirer 101 may perform a predetermined computation (for example, four arithmetic operations) based on the data acquired from two or more sensors and may provide the data after the computation, to the transmission buffer 102.

The transmission buffers 102A, 102B receive the data from the data acquirers 101A, 101B, and store the received data in internal storage regions. That is, the transmission buffers 102A, 102B perform the buffering of the data acquired from the data acquirers 101A, 101B. The transmission buffers 102A, 102B manage orders in which the data is received, and output the data in the orders in which the data is received. Each of the transmission buffers 102A, 102B is a storage device that includes a storage region having a predetermined size and is constituted by a recording medium such as a memory or a hard disk, as an example.

The transmission controller 104 monitors the state of the buffering by the transmission buffers 102A, 102B, and controls the readout and transmission of the data from the transmission buffers 102A, 102B. For example, for the data for the application having a tight time constraint for data transmission (for example, a case where the data is sent to the application within 1 second from the detection of the data), the transmission controller 104 performs such a control that the data is immediately read from the transmission buffer in which the data is stored. On the other hand, as for the data for the application having a loose time constraint for data transmission (for example, a case where the data is sent to the application within 24 hours from the detection of the data), the transmission controller 104 performs such a control that the data is read when the data for application having a tight time constraint is not stored in the transmission buffer for storing the data for application having a tight time constraint. Further, the transmission controller 104 may perform such a control that the bandwidth of a channel to be used in the communication network 30 is checked and the data for the application having a loose time constraint for data transmission is read only when there is a spare bandwidth. The transmission controller 104 may control the readout of the data by another method. For example, the transmission controller 104 may read the data from each transmission buffer at a rate corresponding to the time constraint for data transmission.

As to whether the time constraint is tight or loose, for example, a tight or loose time constraint may be previously set for each application, and the information concerning the time constraint may be shared between the transmission device 10 and the receipt device 20. Alternatively, whether the time constraint is tight or loose may be determined based on the comparison with a threshold. In this case, when the time constraint is less than the threshold, it is determined that the time constraint is tight, and when the time constraint is equal to or more than the threshold, it is determined that the time constraint is loose. Whether the time constraint is tight or loose may be determined by another method.

The data flow synthesizer (packet generator) 103 reads the data from the transmission buffers 102A, 102B based on the control by the transmission controller 104. The data flow synthesizer 103 generates the DFMP packet by processing the read data in accordance with the data flow control protocol (DFCP) and the data flow management protocol (DFMP). The data flow synthesizer 103 includes a packet generator that generates the DFMP packet in accordance with the DFCP and the DFMP.

First, the data flow synthesizer 103 adds the DFCP header, which is a header by the data flow control protocol (DFCP), to the read data, so that the DFCP packet (second packet) is obtained.

More specifically, depending on the transmission buffer from which the data is read (or depending on the application corresponding to the read data), the data flow synthesizer 103 determines a sequence number (referred to as a local sequence number) for each application. Further, the data flow synthesizer 103 acquires the transmission time (second time stamp) of the data from a clock. The data flow synthesizer 103 generates a DFCP header including the local sequence number, the transmission time (second time stamp) and the flow ID. The data flow synthesizer 103 adds the generated DFCP to the read data. Thereby, the DFCP packet is obtained. The flow ID is an identifier that identifies the data acquirer or the application. The data corresponding to an identical flow ID corresponds to the data acquired from an identical sensor, the data read from an identical transmission buffer or the data to be provided to an identical application. The local sequence number corresponds to the second sequence number according to the embodiment.

Figure 3:
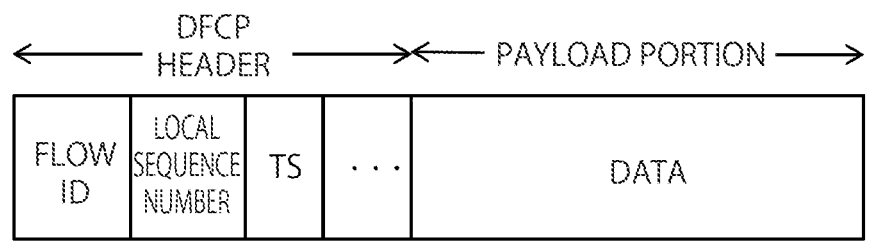
FIG. 3 is a diagram showing an exemplary format of a DFCP packet.

FIG. 3 shows an exemplary format of the DFCP packet. The DFCP packet includes the DFCP header and a payload portion. The data read from the transmission buffer 102 is stored in the payload portion. The DFCP header includes the flow ID, the local sequence number, the transmission time (second time stamp), and the like. In the figure, TS indicates the transmission time (second time stamp). The DFCP header may include other fields. For example, the DFCP header may include a type field showing whether the data included in the payload of the DFCP packet is stream data such as picture data or non-stream data such as event data. It is allowable to adopt a configuration in which the sequence number is not included in the DFCP header in the case of the non-stream data. Further, the DFCP header may include a checksum field for error detection. In addition, the DFCP header may include various fields (fields for version, header length, payload length, reserve and the like) included in headers for general protocols.

Subsequently, by a process in the DFMP, the data flow synthesizer 103 further adds the DFMP header to the generated DFCP packet, so that the DFMP packet is obtained. More specifically, first, the data flow synthesizer 103 determines a consecutive sequence number (referred to as a global sequence number), whenever the DFCP packet is generated. The sequence number determined at this time is a sequence number that is independent from the local sequence number (second sequence number) included in the header of the DFCP packet. The global sequence number corresponds to the first sequence number according to the embodiment. The consecutive sequence number may be determined by any rule, as long as the consecutive sequence number can show the consecutiveness of the DFMP packet. For example, the sequence number may be a number that increases by a constant value (for example, 1), or may be a number that decreases by a constant value. When the sequence number is changed by a certain rule and the rule is shared between the transmission side and the receipt side, it is possible to detect the break of the consecutiveness of the DFMP packet in the case where the sequence number is missed halfway.

Further, the data flow synthesizer 103 acquires the transmission time (first time stamp) from the clock. The data flow synthesizer 103 generates the DFMP header including the global sequence number (first sequence number) and the transmission time (first time stamp). The data flow synthesizer 103 adds the DFMP header to the DFCP packet, so that the DFMP packet is obtained. As the transmission time included in the DFMP header, the same value as the transmission time included in the DFCP header may be used.

Figure 4:
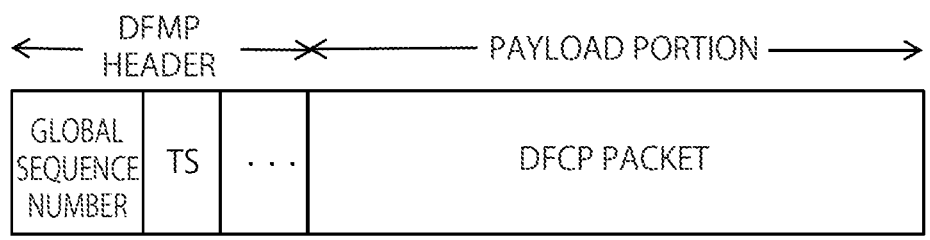
FIG. 4 is a diagram showing an exemplary format of a DFMP packet.

In this way, whenever the data flow synthesizer 103 reads the data from the transmission buffers 102A, 102B, the data flow synthesizer 103 generates the DFMP packet by adding the DFCP header to the data and further adding the DFMP header. The DFCP header includes a local sequence number for each application and a certain flow ID for each application, and the like. The DFMP header includes the global sequence number that is applied to the whole of the plurality of applications, and the like FIG. 4 shows an exemplary format of the DFMP packet. The DFMP packet includes the DFMP header and a payload portion. The DFCP packet is stored in the payload portion. As described above, the DFMP header includes the global sequence number (first sequence number) and the transmission time (first time stamp). In the figure, TS indicates the transmission time (first time stamp). The DFMP header may include other fields. For example, the DFMP header may include fields for version, header length, payload length, reserve and the like.

The transmitters 105A, 105B communicate with the receipt device 20, using different communication protocols from each other. As an example, one communicator performs communication in accordance with a protocol for the 5G mobile standard, and the other communicator performs communication in accordance with a protocol for the 4G (LTE) mobile standard. The 5G mobile standard and the 4G mobile standard are examples of the communication protocol, and another protocol such as wireless LAN may be used.

The data flow synthesizer 103 provides the generated DFMP packet to at least one of the transmitters 105A, 105B, under the control by the transmission controller 104. As an example, the data flow synthesizer 103 may provide the DFMP packet to a previously set one of the transmitters 105A, 105B, as an initial state. The transmitters 105A, 105B add a header for a transport layer, a header for a network layer and a header for data link layer, to the DFMP packet provided from the data flow synthesizer 103, so that a data link layer packet is obtained. For example, the transport layer includes a UDP (User Datagram Protocol) and a DTLS (Datagram Transport Layer Security). For example, the network layer includes an IP (Internet Protocol). For example, the data link layer includes a protocol for Ethernet (R) or IEEE802.11. All of the layers are not essential, and for example, some layers such as the transport layer may be excluded.

FIG. 5 shows an exemplary format of the data link layer packet. In this example, the data link layer packet includes an Ethernet header, an IP header, an UDP header, a DTLS Record header, a DTLS HMAC, a DFMP header, a DFCP header, a payload portion, and an Ethernet FCS (Frame Check Sequence). The data (the data detected by the sensor) in the payload portion of the DFCP packet is stored in the payload portion. The DFMP and the DFCP are protocols that are upper than the IP (Interne Protocol) and are protocols that are upper than the UDP.

The transmitter 105 further adds a header for a physical layer to the data link layer packet, so that a physical packet is obtained. The transmitter 105 transmits the physical packet through the antenna 107. More specifically, the transmitter 105 performs the modulation and DA conversion of the physical packet, to generate an analog signal, and performs the extraction of a signal in a desired bandwidth from the analog signal and the up-conversion of the extracted signal to a wireless frequency. The transmitter 105 amplifies the signal having the wireless frequency by an amplifier, and transmits the amplified signal having the wireless frequency, through the antenna 107.

The information communicator 106 receives the feedback information concerning the receipt of the DFMP packet from the receipt device 20. As an example, the feedback information includes communication quality information concerning the receipt quality of the DFMP packet, a retransmission request for the DFCP packet, alteration information of the time constraint of the application and the like. Examples of the communication quality information include packet loss rate and fluctuation information of the delay time of the arrival of the packet.

The transmission controller 104 receives the feedback information from the information communicator 106 and controls the data readout and data transmission from the transmission buffers 102A, 102B, based on the feedback information. As an example, in the case where the packet loss rate or the fluctuation information of the delay time is equal to or more than a threshold, the transmission controller 104 gives redundancy to the data (event data about sudden braking, control data about the vehicle, or the like) for the application having a tight time constraint (for example, 1 second), or preferentially transmits the data.

As an example of the transmission after the transmission controller 104 gives redundancy to the data for the application having a tight time constraint, there is a duplicate transmission of the same data as a plurality of packets. Furthermore, there is a transmission of the plurality of packets to separate transmitters (for example, a transmission of the plurality of packets including the same data by both 5G and 4G).

Further, as an example of the preferential transmission of the data for the application having a tight time constraint, there is a decrease in the transmission rate of the data for the application having a loose time constraint (for example, 10 minutes or 1 day), for example. The decrease in the transmission rate reduces the number of all packets that are transmitted from the transmission device 10, and therefore the reduction in the disappearance of the packet due to the congestion or the like in the middle of the sending is expected.

Thereby, each of the data for the application having a tight time constraint and the data for the application having a loose time constraint satisfies the time constraint.

Further, in the case where the transmission controller 104 receives the retransmission request as the feedback information, the transmission controller 104 performs such a control that the DFCP packet having the local sequence number about the retransmission request is retransmitted. Further, in the case where the transmission controller 104 receives the alteration information of the time constraint of the application, the transmission controller 104 alters the time constraint of the corresponding application.

Figure 6:
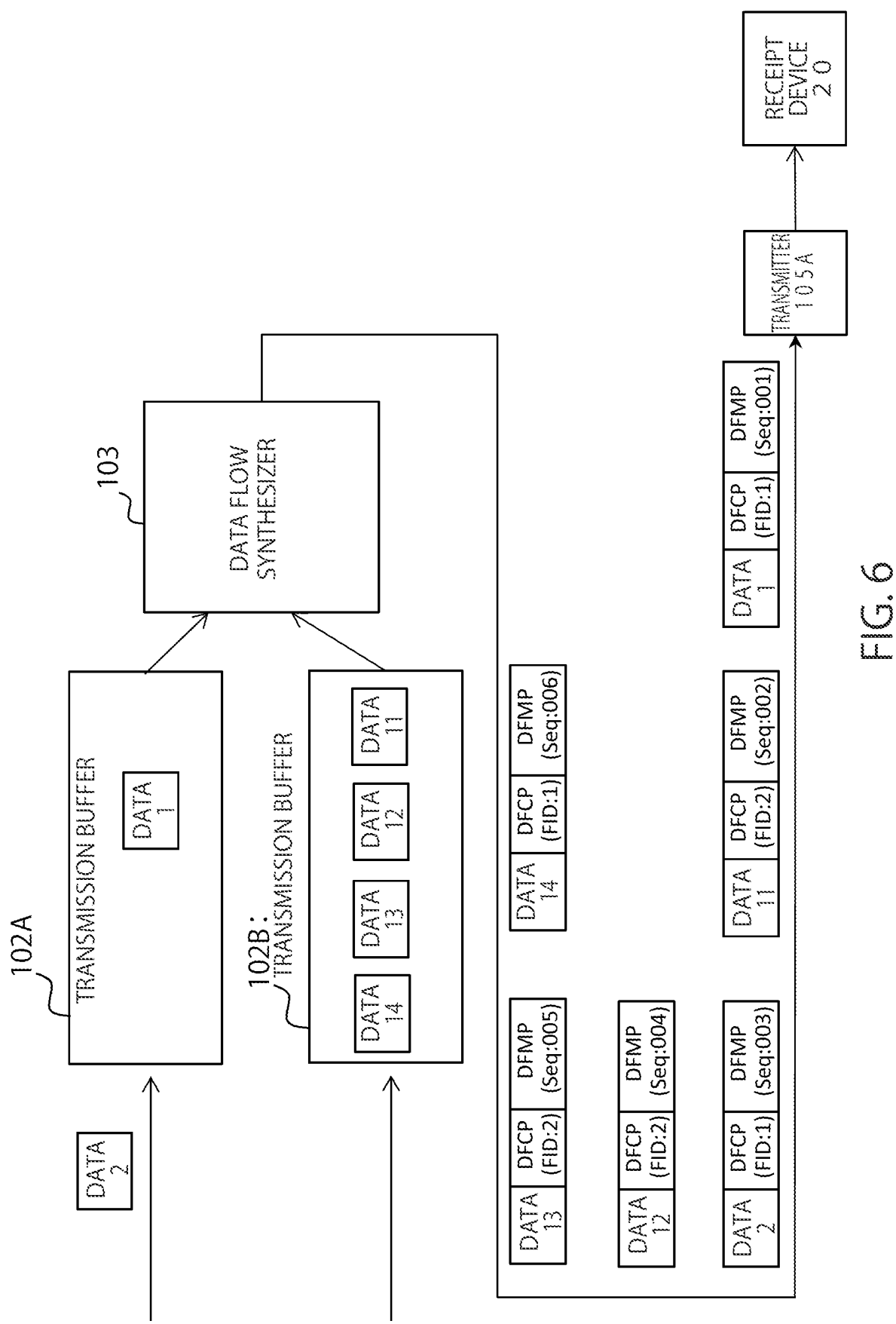
FIG. 6 is a diagram showing a specific example of the behavior of the transmission device according to the first embodiment.

FIG. 6 is a diagram showing a specific example of the behavior of the transmission device 10. In the transmission buffer 102A, data 1 is stored as data concerning an application A having a tight time constraint for data transmission. Subsequently, data 2 is stored from the data acquirer 101A. It is assumed that the flow ID of the application A is 1.

On the other hand, in the transmission buffer 102B, data 11, data 12, data 13 and data 14 are stored in this order, as data concerning an application B having a loose time constraint for data transmission. It is assumed that the flow ID of the application B is 2.

When the data is being buffered in the transmission buffer 102A, the data flow synthesizer 103 immediately reads the data (the data 1 in this example) under the control by the transmission controller 104. Thereafter, no data exists in the transmission buffer 102A, and therefore the data flow synthesizer 103 next reads the data 11 from the transmission buffer 102B. Suppose that the data 2 having a loose time constraint is buffered in the transmission buffer 102A just after the readout of the data 11. Therefore, the data flow synthesizer 103 reads the data 2 before the data 12. Thereafter, no data exists in the transmission buffer 102A, and therefore the data flow synthesizer 103 reads the data 12, the data 13 and the data 14 from the transmission buffer 102B.

In the order of the readout of the data, the data flow synthesizer 103 adds the DFCP header including the flow ID for the application, to the read data, so that the DFCP packet is obtained. Then, the data flow synthesizer 103 further adds the DFMP header including the global sequence number, so that the DFMP packet is obtained. The local sequence number in the DFCP header is consecutive for each flow ID (that is, for each application). The global sequence number in the DFMP header is consecutive regardless of the flow ID. That is, a sequence number in a system that is common among the plurality of applications is used.

In the example of the figure, a DFCP header containing "FID: 1" is a DFCP header in which the flow ID is 1, and a DFCP header containing "FID: 2" is a DFCP header in which the flow ID is 2. "Seq: XXX" means that the global sequence number in the DFMP header is XXX. The illustration of the local sequence number in the DFCP header is omitted. In addition, the time stamp or the like may be contained in at least one of the DFCP header and the DFMP header.

When a DFMP packet having a global sequence number XXX is referred to as a DFMP packet XXX, the DFMP packet is output to the transmitter 105A, in the order of a DFMP packet 001, a DFMP packet 002, a DFMP packet 003, a DFMP packet 0004, a DFMP packet 005 and a DFMP packet 006. The transmitter 105A adds the IP header and the like to each DFMP packet input from the data flow synthesizer 103, so that the physical packet is obtained. The transmitter 105A transmits the physical packet to the receipt device 20 through the antenna 107A.

Suppose that the information communicator 106 of the transmission device 10 receives the feedback information (communication quality information) from the receipt device 20 after the transmission of the DFMP packets 001 to 006. Suppose that the transmission controller 104 determines from the feedback information that the packet loss rate is exceeding the threshold. As an example, the transmission controller 104 instructs the data flow synthesizer 103 such that the data flow synthesizer 103 gives redundancy to the data for the application A having a tight time constraint for data transmission and transmits the data. The data flow synthesizer 103 determines to replicate (copy) the data for the application A, and to transmit the data using the two transmitters 105A, 105B.

Figure 7:
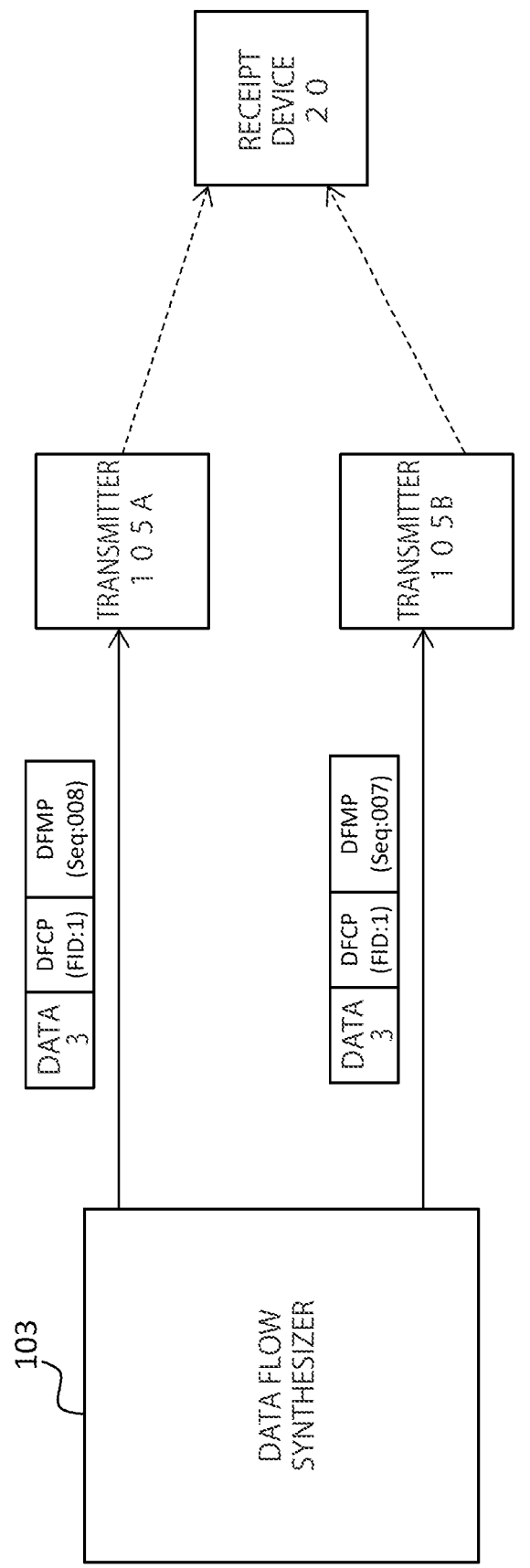
FIG. 7 is a diagram showing a specific example of redundancy.

FIG. 7 shows a specific example of the redundancy. Suppose that the data 3 related to the application A and having a tight time constraint is stored in the transmission buffer 102A after the transmission of the DFMP packets 001 to 006. The data flow synthesizer 103 immediately reads the data 3 from the transmission buffer 102A, copies the data 3, and generates a DFCP packet including the data 3 and a DFCP packet including the same data as the data 3. Then, the data flow synthesizer 103 determines global sequence numbers 007, 008 that are different from each other, and adds DFMP headers including the global sequence numbers 007, 008, to the two generated DFCP packets, so that DFMP packets 007, 008 are obtained. The data flow synthesizer 103 provides the DFMP packet 007 to the transmitter 105A and provides the DFMP packet 008 to the transmitter 105B. The transmitter 105A transmits the DFMP packet 007, and the transmitter 105B transmits the DFMP packet 008. The DFMP packets 007, 008 are transmitted to the receipt device 20 through channels that are different from each other. When one DFMP packet arrives at the receipt device 20, the receipt device 20 determines that the loss of the DFCP packet including the data 3 does not occur, even if the other DFMP packet is lost.

In the example of FIG. 7, redundancy is given to the data for the application A having a tight time constraint. As another example, the use bandwidth of the channel for the transmitter 105A may be reduced by decreasing the rate of the data for the application B having a loose time constraint. Thereby, the number of packets that are transmitted through the channel for the transmitter 105A is reduced, and therefore it is possible to reduce the possibility that the DFMP packet for the application A is lost in the middle of the communication network. Particularly, in the case where many transmission devices 10 are connected with the communication network and where the transmission devices 10 perform the same process, it is possible to further reduce the possibility of the packet loss.

Figure 8:
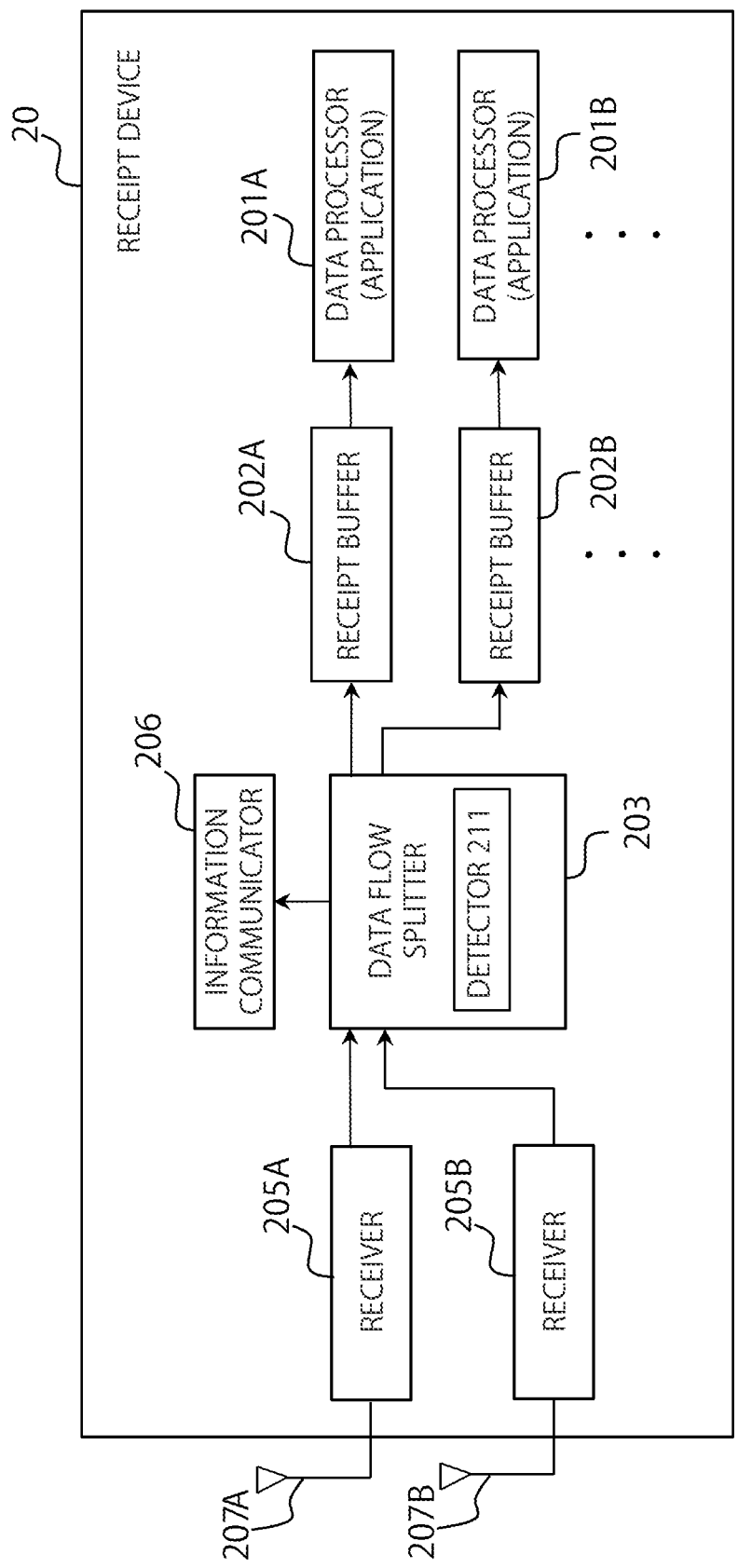
FIG. 8 is a block diagram of a receipt device according to the first embodiment.

FIG. 8 is a block diagram of the receipt device 20. The receipt device 20 includes data processors (applications) 201A, 201B, receipt buffers 202A, 202B, a data flow splitter (data provider) 203, receivers 205A, 205B, an information communicator 206 and antennas 207A, 207B. The data flow splitter 203 includes a detector 211. The receipt device 20 corresponds to an example of the wireless communication device or communication device according to the embodiment. The receipt device 20 performs wireless communication in the embodiment but may be configured to perform wired communication.

The number of data processors is two in the example of FIG. 8 but may be three or more. Similarly, the number of receipt buffers is two, but may be three or more. Further, the number of receivers is two, but may be one, or three or more.

When being not particularly distinguished, the data processors 201A, 201B are referred to as a data processor 201. When being not particularly distinguished, the receipt buffers 202A, 202B are referred to as a receipt buffer 202. When being not particularly distinguished, the receivers 205A, 205B are referred to as a receiver 205. When being not particularly distinguished, the antennas 207A, 207B are referred to as an antenna 207.

The receivers 205A, 205B receive the DFMP packets transmitted from the transmission device 10 through the communication network 30. More specifically, the receivers 205A, 205B receive wireless signals through the antennas 207A, 207B, amplify the received signals, and perform the down-conversion to a baseband frequency. The receivers 205A, 205B extract signals in a desired bandwidth from the down-converted signals and perform the AD conversion of the extracted signals. The receivers 205A, 205B modulate the digital signals, and acquire physical packets. The receivers 205A, 205B perform processing and removal of various headers of the physical packets and acquires the DFMP packets. The receivers 205A, 205B provide the DFMP packets to the data flow splitter 203.

The data flow splitter 203 includes the detector 211 that performs the detection of the packet loss based on the header of the DFMP packet. The detector 211 identifies an absent global sequence number, based on the global sequence number included in the header of the DFMP packet. For example, in the case where the global sequence numbers 001, 002, 004, 005 are detected but the global sequence number 003 is not detected, the data flow splitter 203 identifies the global sequence number 003 as the absent global sequence number. In this case, the data flow splitter 203 determines that the packet loss of the DFMP packet having the global sequence number 003 has occurred.

The case of the packet loss includes a case where the DFMP packet disappears in the middle of the pathway in the communication network 30 and does not reach the receipt device 20, a case where an error is detected by the protocol for a lower layer of the DFMP, and a case where the packet cannot be restored by error correction. A case where the protocol for the lower layer has an automatic retransmission control and the packet is properly received by retransmission is not regarded as the packet loss.

The detector 211 calculates the packet loss rate. The packet loss rate is the rate of DFMP packets received by the receipt device 20 to the DFMP packets transmitted from the transmission device 10. The packet loss rate can be calculated by dividing the number of DFMP packets for which the packet loss is detected by the number of the DFMP packets. The packet loss rate may be calculated at internals of a certain period, after the start of the communication with the transmission device 10, for the DFMP packets transmitted during the period. Alternatively, the packet loss rate may be calculated in units of a certain range of the global sequence number, for the DFMP packets included in the range. The packet loss rate may be calculated by another method. Statistical information of the packet loss rate, as exemplified by the average or moving average of the packet loss rate, may be calculated.

Further, the detector 211 calculates the fluctuation information of the delay time, based on the transmission time (first time stamp) included in the header of the DFMP packet and the receipt time of the DFMP packet. The receipt time is acquired by reading the time of the clock. The fluctuation information indicates the magnitude or degree of the variation of the delay time. As an example, the fluctuation information may be the standard deviation of the time difference. Further, the fluctuation information may be the difference between the average of the time difference and the minimum or maximum of the time difference. The fluctuation information of the delay time may be calculated by another method. Further, statistical information of the fluctuation information may be calculated.

The data flow splitter 203 generates the communication quality information concerning the receipt quality of the DFMP packet, as an example of the feedback information, and provides the generated communication quality information to the information communicator 206. As an example, the communication quality information includes at least one of the information of the global sequence number (first sequence number) for which the packet loss has occurred, the packet loss rate and the fluctuation information of the delay time. Further, the communication quality information may include the statistical information of the packet loss rate and the like. The information communicator 206 transmits the communication quality information to the transmission device 10 through the communication network 30. As the communication protocol that is used by the information communicator 206 for the transmission of the feedback information, any standard, which includes the 5G mobile communication standard, the 4G mobile communication standard, the wireless LAN standard and other communication standards, may be used.

The data flow splitter (data provider) 203 acquires the DFCP packet by removing the DFMP header from the received DFMP packet. The data flow splitter 203 identifies the application to which the data included in the payload of the DFCP packet needs to be passed, based on the flow ID included in the header of the DFCP packet. The data flow splitter 203 provides the data included in the payload of the DFCP packet, to the receipt buffer 202 corresponding to the identified application.

In the case where the data in the payload of the DFCP packet is stream data and where the completeness of the data is required, the data flow splitter 203 surveys the local sequence number of the DFCP header. When there is an absent local sequence number, the data flow splitter 203 generates the retransmission request for the DFCP packet, as the feedback information. Further, in the case where the DFCP header includes the checksum, the data flow splitter 203 performs an error detection process of the DFCP packet, and in the case where an error is detected, the data flow splitter 203 generates the retransmission request for the DFCP packet. The information communicator 206 transmits the generated retransmission request to the transmission device 10 through the communication network 30, as the feedback information. In the case where the data in the payload of the DFCP packet is a data type that does not require the completeness of the data, the information communicator 206 does not need to transmit the retransmission request.

In the case where there is an application for which the time constraint (priority) for data transmission has been altered among the plurality of applications, the data flow splitter 203 generates the alteration information of the time constraint for the data transmission to the application. The information communicator 206 transmits the alternation information to the transmission device 10 through the communication network 30, as the feedback information.

For example, in the case where the alteration of the time constraint for data transmission is requested by the data processor 201, the data flow splitter 203 generates the alteration information. For example, in the case where the data about the obstacle is accumulated at a certain spot and therefore the need to collect obstacle detection data from the automobile existing at the spot decreases, the data flow splitter 203 loosens the time constraint for data transmission, for the automobile existing at the spot.

The receipt buffers 202A, 202B store the data provided from the data flow splitter 203, in internal storage regions. That is, the receipt buffers 202A, 202B buffer the data provided from the data flow splitter 203. The receipt buffers 202A, 202B output the buffered data, in the order of the receipt from the data flow splitter 203. The way to output the data from the receipt buffers may vary depending on the kind of the data to be output. As an example, the receipt buffers 202A, 202B may output the data in response to requests from the data processors 201A, 201B. Alternatively, the receipt buffers 202A, 202B may output the data just after the data is input. Alternatively, the receipt buffers 202A, 202B may output the buffered data at a certain time interval. Each of the receipt buffers 202A, 202B is a storage device that includes a storage region having a predetermined size. As an example, each of the receipt buffers 202A, 202B is constituted by a recording medium such as a memory or a hard disk.

The data processors 201A, 201B are application executors that process the data provided from the receipt buffers 202A, 202B by executing applications. As an example, the data processor 201A includes the application A and a CPU, and the CPU executes the application A. As an example, the data processor 201B includes the application B and a CPU, and the CPU executes the application B. Examples of the application include an application for the generation of the high definition map, an application for the generation of the optimization model for engine control, and an application for the generation of the road safety information. However, they are just examples, and there are various other applications.

Figure 9:
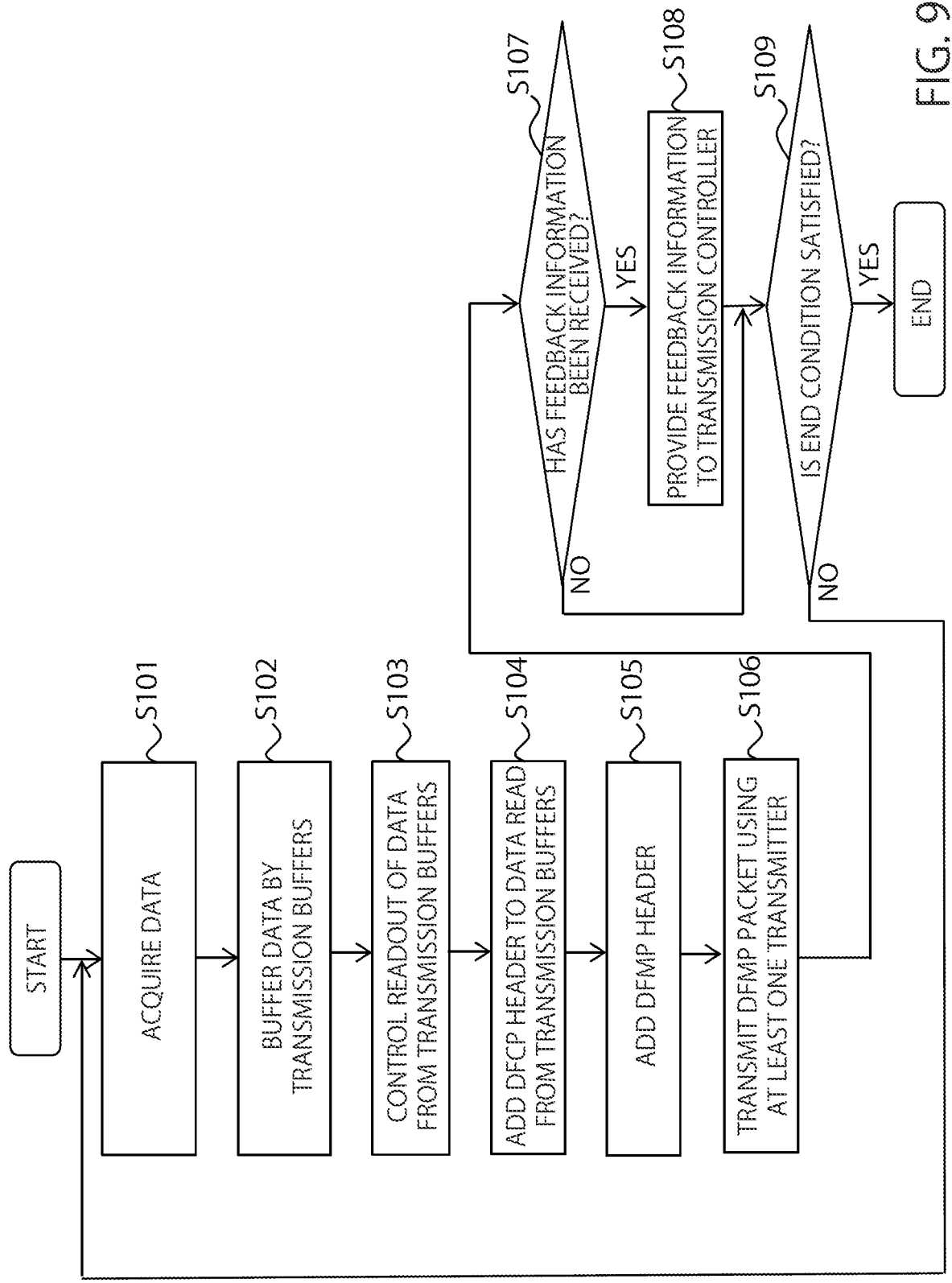
FIG. 9 is a flowchart of an example of the behavior of the transmission device according to the first embodiment.

FIG. 9 is a flowchart of an example of the behavior of the transmission device 10 according to the embodiment. The order of the steps shown in FIG. 9 is an example, and the positions of some steps may be switched. For example, steps S107, S108 may be positioned before step S101.

The data acquirers 101A, 101B acquire the data detected by the sensors 1A, 1B (S101).

The transmission buffers 102A, 102B buffer the data acquired by the data acquirers 101A, 101B (S102).

The transmission controller 104 controls the readout of the data from the transmission buffers 102A, 102B and the transmission of the data by the data flow synthesizer 103 (S103). This control is performed based on at least one of the time constraint for data transmission for each application and the feedback information received from the receipt device 20. For example, in the case where the packet loss rate is equal to or higher than the threshold or in the case where the magnitude of the fluctuation of the delay time is equal to or more than the threshold, the transmission controller 104 outputs an instruction signal to the data flow synthesizer 103, such that redundancy is given to the data for the application having a tight time constraint and the data is transmitted. For example, the transmission controller 104 gives an instruction to copy the data having a tight time constraint and to transmit the data using transmitters that are separate from each other. Alternatively, the transmission controller 104 may decrease the bandwidth utilization rate of the channel and may reduce the loss of the packet, by outputting a signal indicating an instruction to decrease the transmission rate of the data for the application having a loose time constraint (including the case of a temporary stop of the transmission). Alternatively, the transmission controller 104 may give an instruction to dispersedly transmit the data having a tight time constraint using a plurality of transmitters. The transmission controller 104 may give an instruction to dispersedly transmit the data for all applications using a plurality of transmitters, regardless of the time constraint.

The data flow synthesizer 103 reads the data from the transmission buffers 102A, 102B, under the control by the transmission controller 104 (S104). The data flow synthesizer 103 adds the DFCP header including the flow ID about the corresponding application, to the read data, so that the DFCP packet is obtained (S104). In addition to the field for the flow ID, the DFCP header may further include other fields for the local sequence number (second sequence number), the transmission time (second time stamp), the checksum and the like.

The data flow synthesizer 103 further adds the DFMP header including the global sequence number (first sequence number), to the DFCP packet, so that the DFMP packet is obtained (S105). The DFMP header may further include other fields for the transmission time (first time stamp) and the like.

The data flow synthesizer 103 provides the DFMP packet to at least one of the transmitters 105A, 105B, under the control by the transmission controller 104. At least one of the transmitters 105A, 105B transmits the DFMP packet to the receipt device 20 through the antenna 107A or the antenna 107B. More specifically, at least one of the transmitters 105A, 105B transmits the physical packet in which headers for various lower layers are added to the DFMP packet.

After the transmission of the DFMP packet, the information communicator 106 determines whether the feedback information (the communication quality information, the retransmission request, the alteration information of the time constraint, and the like) has been received from the receipt device 20 (S107). In the case where the feedback information has been received, the information communicator 106 provides the feedback information to the transmission controller 104 (S108). In the case where the transmission controller 104 receives the retransmission request as the feedback information, the transmission controller 104 retransmits the requested DFCP packet, and in the case where the transmission controller 104 receives the alteration information of the time constraint for the data transmission to the application, the transmission controller 104 alters the time constraint for the corresponding application. Thereafter, the behavior proceeds to step S109. Also in the case where the feedback information has not been received, the behavior proceeds to step S109.

It is determined whether an end condition is satisfied (S109). In the case where the end condition is not satisfied (NO), the behavior returns to step S101. In the case where the end condition is satisfied (YES), the behavior ends. Examples of the end condition include a case where the engine of the automobile is stopped and a case where the transmission device 10 is stopped.

Figure 10:
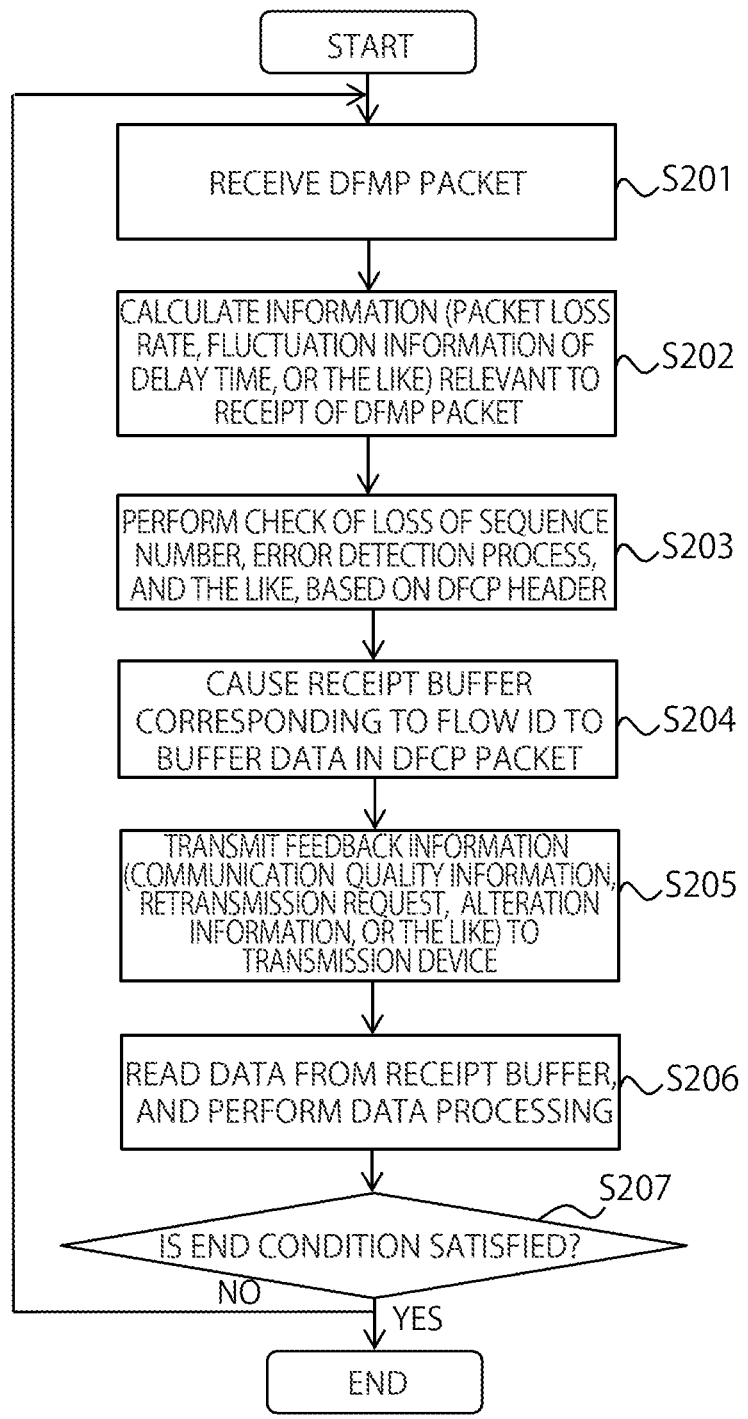
FIG. 10 is a flowchart of an example of the behavior of the receipt device according to the first embodiment.

FIG. 10 is a flowchart of an example of the behavior of the receipt device 20 according to the embodiment. The order of the steps shown in FIG. 10 is an example, and the positions of some steps may be switched. For example, step S205 may be positioned before step S203.

At least one of the receivers 205A, 205B receives the DFMP packet transmitted from the transmission device 10, through the communication network 30 (S201). More specifically, at least one of the receivers 205A, 205B receives the physical packet, and acquires the DFMP packet by performing the processing and removal of various headers of the physical packet.

The data flow splitter 203 calculates information concerning the receipt of the DFMP packet, based on the header (the global sequence number, the transmission time and the like) of the DFMP packet (S202). For example, the data flow splitter 203 calculates the communication quality information including at least one of the packet loss rate and the fluctuation information of the time delay. The data flow splitter 203 provides the communication quality information to the information communicator 206, as the feedback information.

The data flow splitter 203 removes the header of the DFMP packet, so that the DFCP packet is obtained. Then, based on the header of the DFCP packet, the data flow splitter 203 performs the check of the loss of the local sequence number (second sequence number), the error detection process based on the checksum, and the like (S203). In the case where there is a loss of the local sequence number or in the case where an error is detected, the data flow splitter 203 generates the retransmission request for the DFCP packet for the corresponding local sequence. The data flow splitter 203 provides the retransmission request to the information communicator 206, as the feedback information. In the case where the data in the DFCP packet is a type of data that does not require the retransmission, the data flow splitter 203 does not need to generate the retransmission request. Further, in the case of the alteration of the time constraint for the application, the data flow splitter 203 may generate the alteration information of the time constraint and may provide the alteration information to the information communicator 206, as the feedback information.

The data flow splitter 203 provides the data in the acquired DFCP packet, to the receipt buffer corresponding to the flow ID in the DFCP header and causes the receipt buffer to buffer the data (S204).

The information communicator 206 transmits the feedback information (at least one of the communication quality information, the retransmission request and the alteration information of the time constraint, or the like) provided from the data flow splitter 203, to the transmission device 10, through the communication network 30 (S205).

The data processors 201A, 201B read the data buffered by the receipt buffers 202A, 202B, and execute the data processing (S206). The data processors 201A, 201B are application executors that execute the applications A, B.

It is determined whether an end condition is satisfied (S207). In the case where the end condition is not satisfied (NO), the behavior returns to step S201. In the case where the end condition is satisfied (YES), the behavior ends. Examples of the end condition include a case where an administrator stops an electric power source of the receipt device 20.

As described above, according to the embodiment, in the transmission device, the DFCP header including the flow ID is added to the data to be provided to the application on the receipt side, and the DFMP header including the global sequence number is further added. Thereby, the data to be provided to a plurality of applications can be managed as an identical data flow. Then, the feedback information concerning the receipt of the DFMP packet that is received as an identical data flow is fed back to the transmission side, and the feedback information is reflected in the transmission control of the data for each application, on the transmission device side. Thereby, even in a situation where the data for a plurality of applications is mixed and is transmitted, it is possible to individually perform the transmission control of the data for each application, and to satisfy the time constraint for each application. As a comparative example, in the case where a usual internet protocol (TCP/UDP) is used and where a server collects data for various applications from the mobile entity, the server performs the flow control to the data for the applications independently, and therefore, it is difficult to autonomously perform bandwidth regulation for data among the plurality of applications. In contrast, in the embodiment, since the data for the plurality of applications can be managed as an identical data flow, it is possible to easily perform the bandwidth regulation for data among the plurality of applications. Consequently, it is possible to appropriately manage the transmission of a plurality of pieces of data.

Second Embodiment

A second embodiment is characterized by aggregating two or more DFCP packets having different flow IDs to one DFMP packet. When data (for example, control data) having a small size is solely packetized, the ratio of the size of various headers (the IP header, the DFMP header) increases, and the communication efficiency decreases. Hence, a DFCP packet including data having a small size is integrated with another DFCP packet. Thereby, the ratio of headers in one packet decreases, and the communication efficiency increases. Block diagrams in the embodiment are the same as FIG. 6 and FIG. 8 in the first embodiment. For configurations and behaviors of the blocks, differences from the first embodiment will be mainly described, and the same descriptions as those in the first embodiment will be omitted.

Figure 11:
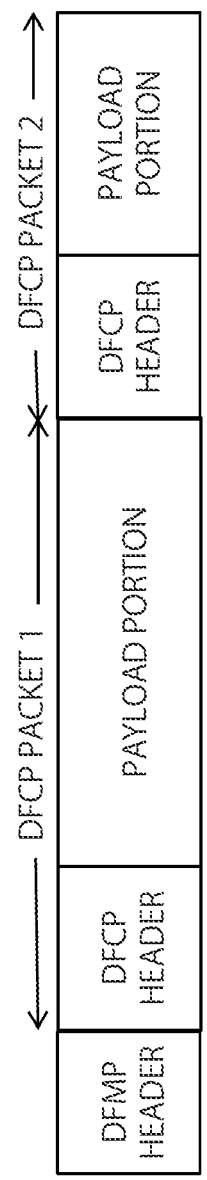
FIG. 11 is a diagram showing an example in which two DFCP packets are aggregated into one DFMP packet.

FIG. 11 shows an example in which a DFCP packet 1 including data for a certain application and a DFCP packet 2 including data for another application are integrated to one DFMP packet. The flow ID of the DFCP packet 1 and the flow ID of the DFCP packet 2 are different from each other. The integration of packets is performed by the data flow synthesizer 103. The data flow synthesizer 103 integrates a plurality of DFCP packets to one DFMP packet such that the size of the packet is within the maximum size (for example, the maximum size length of the IP packet). Thereby, it is possible to reduce the overhead for headers, compared to a case where headers for the DFMP and lower protocols are added to each data. The flow IDs of the joined DFCP packets are different from each other in the example of FIG. 11, but, the flow IDs of the joined DFCP packets may be the same as each other. Further, the number of the joined DFCP packets is two in the example of FIG. 11 but may be three or more.

Figure 12:
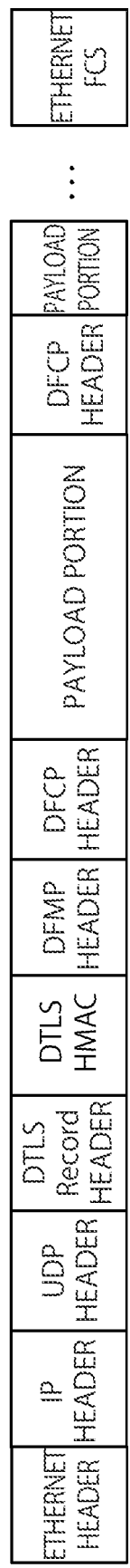
FIG. 12 is a diagram showing an example in which various headers are added to a DFMP packet to which a plurality of DFCP packets are aggregated.

FIG. 12 shows an example of a packet in which various headers such as the IP header are added to the DFMP packet including a plurality of joined DFCP packets. In the payload portion of the DFMP packet, two or more DFCP packets are joined. The flow IDs of the DFCP packets are different. As the number of headers for layers lower than the DFMP is larger, the effect of the packet integration is higher.

The joining of DFCP packets is performed by the data flow synthesizer 103 of the transmission device 10. The data flow synthesizer 103 tandemly joins two or more generated DFCP packets and adds the DFMP header to the joined packets. Similarly to the first embodiment, the DFMP header includes the global sequence number (first sequence number), the transmission time (first time stamp), and the like.

As an example of the packet joining, a DFCP packet having a short payload length is joined to a DFCP packet having a long payload length. Thereby, it is possible to greatly cut the overhead for headers, compared to a case where the DFCP packet having a short payload length is solely transmitted. Examples of the data having a short payload length include control data and event data. In the case where a FEC (Forward Error Correction) process of data is performed on the receipt side and where data for the FEC is transmitted as a packet separately from the data, the data for the FEC may be joined. Redundancy may be given by copying the DFCP packet having a short payload length and joining the DFCP packets to separate DFCP packets.

Figure 13:
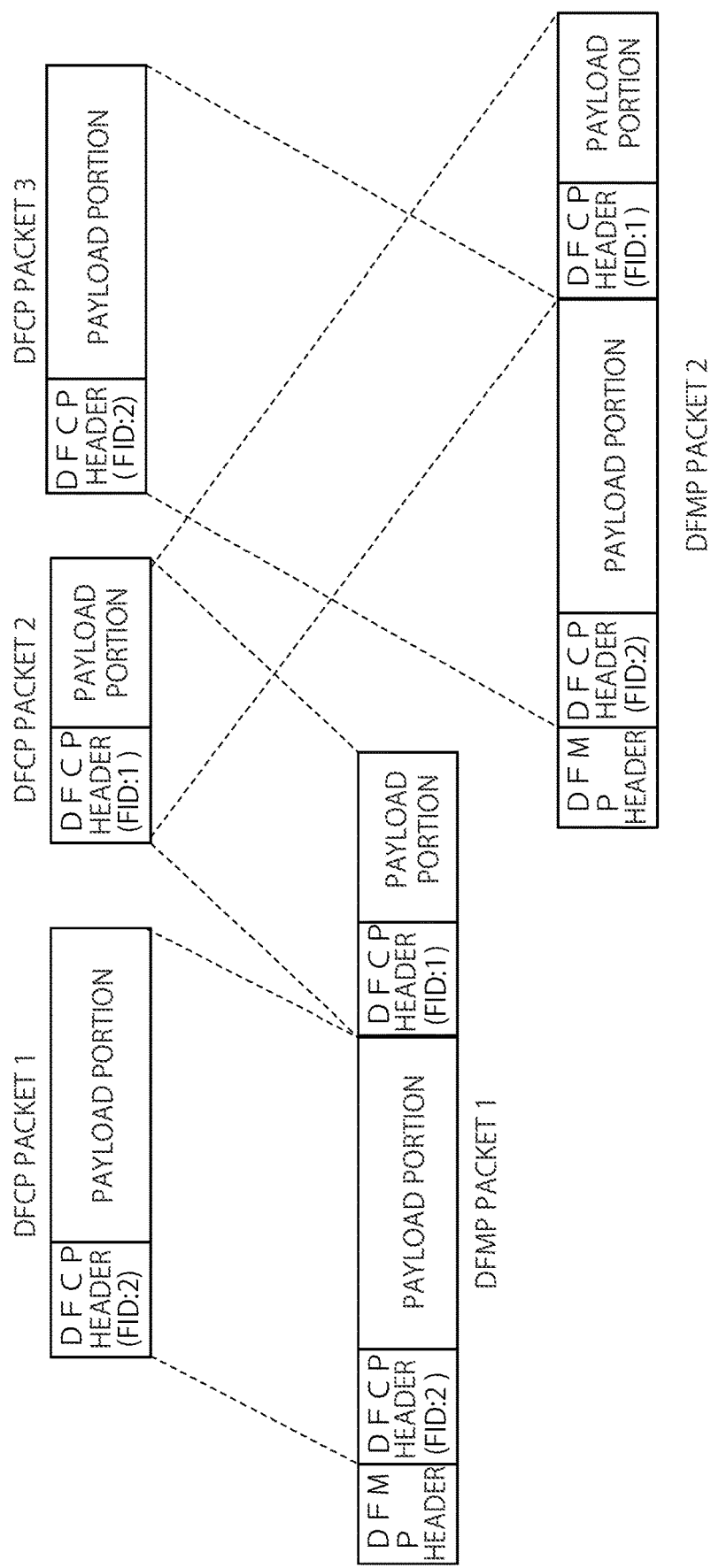
FIG. 13 is a diagram showing an example in which a DFCP packet having a short payload length is transmitted after redundancy is given.

FIG. 13 shows a specific example in which a DFCP packet having a short payload length is joined to a DFCP packet having a long payload length. It is assumed that redundancy is given to a DFCP packet (flow ID=1) including the control data and the like and the DFCP packet is transmitted based on the feedback information (communication quality information) from the receipt device 20. A DFCP packet 2 is copied, so that two DFCP packets 2 are obtained. One DFCP packet 2 is joined to a DFCP packet 1 (flow ID=2), so that a DFMP packet 1 is obtained. The other DFCP packet 2 is joined to a DFCP packet 3 (flow ID=2), so that a DFMP packet 2 is obtained. As an example, the DFCP packets 1, 3 include data having a long payload length, as exemplified by picture data. The DFMP packets 1, 2 can be transmitted using separate transmitters, or can be transmitted using an identical transmitter.

The transmission controller 104 controls the packet joining in the data flow synthesizer 103, based on the feedback information (communication quality information) from the receipt device 20. As an example, in the case where the packet loss rate indicating the communication quality information is a threshold or higher, the transmission controller 104 gives redundancy to the DFCP packet for an application having a tight time constraint for data transmission and having a short data length. For example, the transmission controller 104 determines to copy the DFCP packet, to join one DFCP packet to the DFCP packet for a first other application, and to join the other DFCP packet to the DFCP packet for a second other application. The first and second other applications may be an identical application (that is, an identical ID), or may be different applications (that is, different flow IDs). The transmission controller 104 outputs a signal indicating an instruction of the determined joining method, to the data flow synthesizer 103. The data flow synthesizer 103 performs the packet joining in accordance with the instruction from the transmission controller 104.

Similarly to the first embodiment, the transmission controller 104 may determine a transmitter that is used for the transmission of the DFMP packet, and may instruct the data flow synthesizer 103 such that the determined transmitter is used. For example, the transmission controller 104 may designate different transmitters from each other, for the transmission of a plurality of DFMP packets including the same DFCP packet (the DFCP packet after redundancy is given). Thereby, even when the packet loss occurs due to congestion or the like on a channel corresponding to one of the plurality of transmitters, the receipt device side does not make the determination of the packet loss if the DFMP packet can be properly transmitted through the other channel.

The data flow splitter 203 of the receipt device 20 receives the DFMP packet through the receiver 205 and identifies all of one or two or more DFCP packets included in the DFMP packet. The data flow splitter 203 identifies the flow ID from the header of the identified DFCP packet, and provides the data included in the payload portion of the DFCP packet, to the receipt buffer 202 corresponding to the flow ID.

In the case where a plurality of DFCP packets is aggregated into a DFMP packet, the data flow synthesizer 103 of the transmission device may add information indicating whether there is a following DFCP packet, to headers of the aggregated DFCP packets. For example, in the case where a DFCP packet X, a DFCP packet Y and a DFCP packet Z are joined in this order, the data flow synthesizer 103 may add information indicating that the DFCP packet Y follows the DFCP packet X, to the header of the DFCP packet X. Similarly, the data flow synthesizer 103 may add information indicating that the DFCP packet Z follows the DFMP packet Y, to the header of the DFCP packet Y. Thereby, the data flow splitter 203 can easily identify the plurality of DFCP packets aggregated into the DFMP packet.

Further, similarly to the first embodiment, the data flow splitter 203 calculates the communication quality information concerning the receipt quality of the DFMP packet and provides the calculated information to the information communicator 206, as the feedback information. The information communicator 206 transmits the feedback information to the transmission device 10. In addition, similarly to the first embodiment, the information communicator 206 may transmit the retransmission request for the DFCP packet or the alteration information of the time constraint for the application, to the transmission device 10, as the feedback information.

As described above, according to the embodiment, it is possible to reduce the overhead for headers, by aggregating a plurality of DFCP packets concerning a plurality of applications into one DFMP packet. For example, it is possible to decrease the redundancy of headers for layers lower than the DFMP, by putting a plurality of DFCP packets in one DFMP packet. Thereby, it is possible to decrease header occupation of small data, compared to the maximum packet size, and it is possible to efficiently deliver the data.

As a specific example, it is possible to reduce the communication efficiency decrease due to headers, by putting the DFCP packet including data for which retransmission is not preferable due to the constraint about delay and that has a small size, as exemplified by control data, in one UDP packet, together with the DFCP packet including data for another application (for example, data about software update). When redundant data (data resulting from copying the control data or data for FEC) for assuring the loss of the control data is concurrently transmitted as a separate packet, it is possible to reduce the decrease in communication efficiency and increase reliability because of redundancy, by putting another DFCP packet and the DFCP packet including the redundant data in the UDP packet.

Generally, the rate of the packet disappearance due to buffer overflow is proportional to the number of packets, and does not depend on the packet size, in many packet relay devices (a base station, a router and the like). Therefore, the effect of reducing the header occupation in lower layers is thought to be high by joining a small packet to a large packet.

Furthermore, by aggregating a plurality of pieces of data having different delay constraints or different data completeness constraints into one packet, it is possible to perform a priority control or redundancy control for each data while coordinating the constraints for the plurality of pieces of data. Further, in the case where there is a plurality of channels (a plurality of transmitters), the redundancy level (for example, the number of copies of the data) may be controlled for each channel. Thereby, it is expected that the communication become further efficient.

Third Embodiment

Some or all of each device (the transmission device 10 or the receipt device 20) in the above embodiment may be configured in hardware, or information processing of software (program) executed by, for example, a CPU (Central Processing Unit), GPU (Graphics Processing Unit). In the case of the information processing of software, software that enables at least some of the functions of each device in the above embodiments may be stored in a non-volatile storage medium (non-volatile computer readable medium) such as CD-ROM (Compact Disc Read Only Memory) or USB (Universal Serial Bus) memory, and the information processing of software may be executed by loading the software into a computer. In addition, the software may also be downloaded through a communication network. Further, entire or a part of the software may be implemented in a circuit such as an ASIC (Application Specific Integrated Circuit) or FPGA (Field Programmable Gate Array), wherein the information processing of the software may be executed by hardware.

A storage medium to store the software may be a removable storage media such as an optical disk, or a fixed type storage medium such as a hard disk, or a memory. The storage medium may be provided inside the computer (a main storage device or an auxiliary storage device) or outside the computer.

Figure 14:
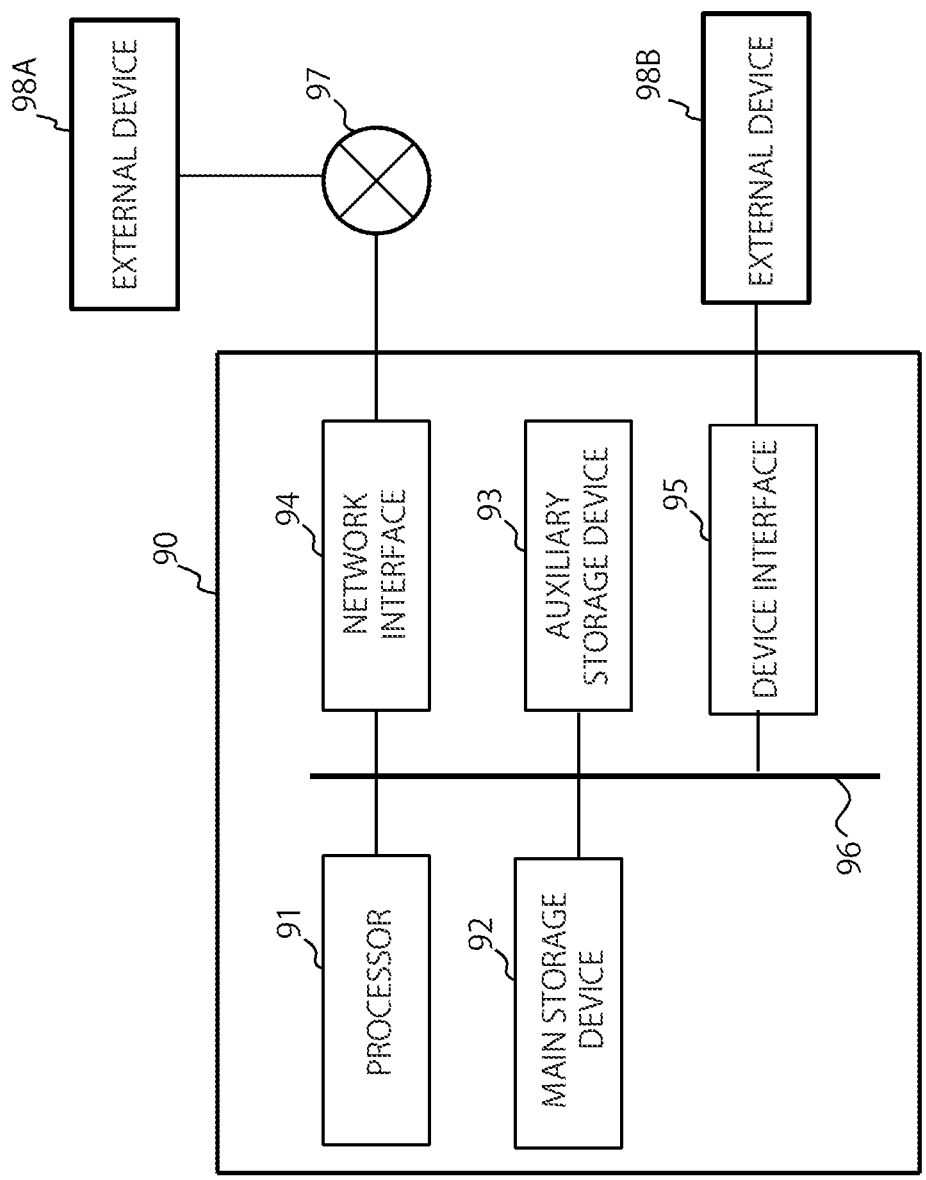
FIG. 14 is a block diagram showing an example of the hardware configuration of the transmission device or the receipt device.

FIG. 14 is a block diagram illustrating an example of a hardware configuration of each device (the transmission device 10 or the receipt device 20) in the above embodiments. As an example, each device may be implemented as a computer 90 provided with a processor 91, a main storage device 92, an auxiliary storage device 93, a network interface 94, and a device interface 95, which are connected via a bus 96.

The computer 90 of FIG. 14 is provided with each component one by one but may be provided with a plurality of the same components. Although one computer 90 is illustrated in FIG. 14, the software may be installed on a plurality of computers, and each of the plurality of computer may execute the same or a different part of the software processing. In this case, it may be in a form of distributed computing where each of the computers communicates with each of the computers through, for example, the network interface 94 to execute the processing. That is, each device (the transmission device 10 or the receipt device 20) in the above embodiments may be configured as a system where one or more computers execute the instructions stored in one or more storages to enable functions. Each device may be configured such that the information transmitted from a terminal is processed by one or more computers provided on a cloud and results of the processing are transmitted to the terminal.

Various arithmetic operations of each device (the transmission device 10 or the receipt device 20) in the above embodiments may be executed in parallel processing using one or more processors or using a plurality of computers over a network. The various arithmetic operations may be allocated to a plurality of arithmetic cores in the processor and executed in parallel processing. Some or all the processes, means, or the like of the present disclosure may be implemented by at least one of the processors or the storage devices provided on a cloud that can communicate with the computer 90 via a network. Thus, each device in the above embodiments may be in a form of parallel computing by one or more computers.

The processor 91 may be an electronic circuit (such as, for example, a processor, processing circuity, processing circuitry, CPU, GPU, FPGA, or ASIC) that executes at least controlling the computer or arithmetic calculations. The processor 91 may also be, for example, a general-purpose processing circuit, a dedicated processing circuit designed to perform specific operations, or a semiconductor device which includes both the general-purpose processing circuit and the dedicated processing circuit. Further, the processor 91 may also include, for example, an optical circuit or an arithmetic function based on quantum computing.

The processor 91 may execute an arithmetic processing based on data and/or a software input from, for example, each device of the internal configuration of the computer 90, and may output an arithmetic result and a control signal, for example, to each device. The processor 91 may control each component of the computer 90 by executing, for example, an OS (Operating System), or an application of the computer 90.

Each device (the transmission device 10 or the receipt device 20) in the above embodiments may be enabled by one or more processors 91. The processor 91 may refer to one or more electronic circuits located on one chip, or one or more electronic circuitries arranged on two or more chips or devices. In the case of a plurality of electronic circuitries are used, each electronic circuit may communicate by wired or wireless.

The main storage device 92 may store, for example, instructions to be executed by the processor 91 or various data, and the information stored in the main storage device 92 may be read out by the processor 91. The auxiliary storage device 93 is a storage device other than the main storage device 92. These storage devices shall mean any electronic component capable of storing electronic information and may be a semiconductor memory. The semiconductor memory may be either a volatile or non-volatile memory. The storage device for storing various data or the like in each device (the transmission device 10 or the receipt device 20) in the above embodiments may be enabled by the main storage device 92 or the auxiliary storage device 93 or may be implemented by a built-in memory built into the processor 91. For example, the storages 102, 202 in the above embodiments may be implemented in the main storage device 92 or the auxiliary storage device 93.

In the case of each device (the transmission device 10 or the receipt device 20) in the above embodiments is configured by at least one storage device (memory) and at least one of a plurality of processors connected/coupled to/with this at least one storage device, at least one of the plurality of processors may be connected to a single storage device. Or at least one of the plurality of storages may be connected to a single processor. Or each device may include a configuration where at least one of the plurality of processors is connected to at least one of the plurality of storage devices. Further, this configuration may be implemented by a storage device and a processor included in a plurality of computers. Moreover, each device may include a configuration where a storage device is integrated with a processor (for example, a cache memory including an L1 cache or an L2 cache).

The network interface 94 is an interface for connecting to a communication network 97 by wireless or wired. The network interface 94 may be an appropriate interface such as an interface compatible with existing communication standards. With the network interface 94, information may be exchanged with an external device 98A connected via the communication network 97. Note that the communication network 97 may be, for example, configured as WAN (Wide Area Network), LAN (Local Area Network), or PAN (Personal Area Network), or a combination of thereof, and may be such that information can be exchanged between the computer 90 and the external device 98A. The internet is an example of WAN, IEEE802.11 or Ethernet (registered trademark) is an example of LAN, and Bluetooth (registered trademark) or NFC (Near Field Communication) is an example of PAN.

The device interface 95 is an interface such as, for example, a USB that directly connects to the external device 98B.

The external device 98A is a device connected to the computer 90 via a network. The external device 98B is a device directly connected to the computer 90.

The external device 98A or the external device 98B may be, as an example, an input device. The input device is, for example, a device such as a camera, a microphone, a motion capture, at least one of various sensors, a keyboard, a mouse, or a touch panel, and gives the acquired information to the computer 90. Further, it may be a device including an input unit such as a personal computer, a tablet terminal, or a smartphone, which may have an input unit, a memory, and a processor.

The external device 98A or the external device 98B may be, as an example, an output device. The output device may be, for example, a display device such as, for example, an LCD (Liquid Crystal Display), or an organic EL (Electro Luminescence) panel, or a speaker which outputs audio. Moreover, it may be a device including an output unit such as, for example, a personal computer, a tablet terminal, or a smartphone, which may have an output unit, a memory, and a processor.

Further, the external device 98A or the external device 98B may be a storage device (memory). The external device 98A may be, for example, a network storage device, and the external device 98B may be, for example, an HDD storage.

Furthermore, the external device 98A or the external device 98B may be a device that has at least one function of the configuration element of each device (the transmission device 10 or the receipt device 20) in the above embodiments. That is, the computer 90 may transmit a part of or all of processing results to the external device 98A or the external device 98B, or receive a part of or all of processing results from the external device 98A or the external device 98B.

In the present specification (including the claims), the representation (including similar expressions) of "at least one of a, b, and c" or "at least one of a, b, or c" includes any combinations of a, b, c, a-b, a-c, b-c, and a-b-c. It also covers combinations with multiple instances of any element such as, for example, a-a, a-b-b, or a-a-b-b-c-c. It further covers, for example, adding another element d beyond a, b, and/or c, such that a-b-c-d.

In the present specification (including the claims), the expressions such as, for example, "data as input," "using data," "based on data," "according to data," or "in accordance with data" (including similar expressions) are used, unless otherwise specified, this includes cases where data itself is used, or the cases where data is processed in some ways (for example, noise added data, normalized data, feature quantities extracted from the data, or intermediate representation of the data) are used. When it is stated that some results can be obtained "by inputting data," "by using data," "based on data," "according to data," "in accordance with data" (including similar expressions), unless otherwise specified, this may include cases where the result is obtained based only on the data, and may also include cases where the result is obtained by being affected factors, conditions, and/or states, or the like by other data than the data. When it is stated that "output/outputting data" (including similar expressions), unless otherwise specified, this also includes cases where the data itself is used as output, or the cases where the data is processed in some ways (for example, the data added noise, the data normalized, feature quantity extracted from the data, or intermediate representation of the data) is used as the output.

In the present specification (including the claims), when the terms such as "connected (connection)" and "coupled (coupling)" are used, they are intended as non-limiting terms that include any of "direct connection/coupling," "indirect connection/coupling," "electrically connection/coupling," "communicatively connection/coupling," "operatively connection/coupling," "physically connection/coupling," or the like. The terms should be interpreted accordingly, depending on the context in which they are used, but any forms of connection/coupling that are not intentionally or naturally excluded should be construed as included in the terms and interpreted in a non-exclusive manner.

In the present specification (including the claims), when the expression such as "A configured to B," this may include that a physically structure of A has a configuration that can execute operation B, as well as a permanent or a temporary setting/configuration of element A is configured/set to actually execute operation B. For example, when the element A is a general-purpose processor, the processor may have a hardware configuration capable of executing the operation B and may be configured to actually execute the operation B by setting the permanent or the temporary program (instructions). Moreover, when the element A is a dedicated processor, a dedicated arithmetic circuit, or the like, a circuit structure of the processor or the like may be implemented to actually execute the operation B, irrespective of whether or not control instructions and data are actually attached thereto.

In the present specification (including the claims), when a term referring to inclusion or possession (for example, "comprising/including," "having," or the like) is used, it is intended as an open-ended term, including the case of inclusion or possession an object other than the object indicated by the object of the term. If the object of these terms implying inclusion or possession is an expression that does not specify a quantity or suggests a singular number (an expression with a or an article), the expression should be construed as not being limited to a specific number.

In the present specification (including the claims), although when the expression such as "one or more," "at least one," or the like is used in some places, and the expression that does not specify a quantity or suggests a singular number (the expression with a or an article) is used elsewhere, it is not intended that this expression means "one." In general, the expression that does not specify a quantity or suggests a singular number (the expression with a or an as article) should be interpreted as not necessarily limited to a specific number.

In the present specification, when it is stated that a particular configuration of an example results in a particular effect (advantage/result), unless there are some other reasons, it should be understood that the effect is also obtained for one or more other embodiments having the configuration. However, it should be understood that the presence or absence of such an effect generally depends on various factors, conditions, and/or states, etc., and that such an effect is not always achieved by the configuration. The effect is merely achieved by the configuration in the embodiments when various factors, conditions, and/or states, etc., are met, but the effect is not always obtained in the claimed invention that defines the configuration or a similar configuration.

In the present specification (including the claims), when the term such as "maximize/maximization" is used, this includes finding a global maximum value, finding an approximate value of the global maximum value, finding a local maximum value, and finding an approximate value of the local maximum value, should be interpreted as appropriate accordingly depending on the context in which the term is used. It also includes finding on the approximated value of these maximum values probabilistically or heuristically. Similarly, when the term such as "minimize" is used, this includes finding a global minimum value, finding an approximated value of the global minimum value, finding a local minimum value, and finding an approximated value of the local minimum value, and should be interpreted as appropriate accordingly depending on the context in which the term is used. It also includes finding the approximated value of these minimum values probabilistically or heuristically. Similarly, when the term such as "optimize" is used, this includes finding a global optimum value, finding an approximated value of the global optimum value, finding a local optimum value, and finding an approximated value of the local optimum value, and should be interpreted as appropriate accordingly depending on the context in which the term is used. It also includes finding the approximated value of these optimal values probabilistically or heuristically.

In the present specification (including claims), when a plurality of hardware performs a predetermined process, the respective hardware may cooperate to perform the predetermined process, or some hardware may perform all the predetermined process. Further, a part of the hardware may perform a part of the predetermined process, and the other hardware may perform the rest of the predetermined process.

In the present specification (including claims), when an expression (including similar expressions) such as "one or more hardware perform a first process and the one or more hardware perform a second process," or the like, is used, the hardware that perform the first process and the hardware that perform the second process may be the same hardware, or may be the different hardware. That is: the hardware that perform the first process and the hardware that perform the second process may be included in the one or more hardware. Note that, the hardware may include an electronic circuit, a device including the electronic circuit, or the like.

In the present specification (including the claims), when a plurality of storage devices (memories) store data, an individual storage device among the plurality of storage devices may store only a part of the data or may store the entire data. Further, some storage devices among the plurality of storage devices may include a configuration for storing data.

While certain embodiments of the present disclosure have been described in detail above, the present disclosure is not limited to the individual embodiments described above. Various additions, changes, substitutions, partial deletions, etc. are possible to the extent that they do not deviate from the conceptual idea and purpose of the present disclosure derived from the contents specified in the claims and their equivalents. For example, when numerical values or mathematical formulas are used in the description in the above-described embodiments, they are shown for illustrative purposes only and do not limit the scope of the present disclosure. Further, the order of each operation shown in the embodiments is also an example, and does not limit the scope of the present disclosure.

The invention claimed is:

1. A communication device comprising:
acquisition circuitry including a plurality of data acquirers configured to acquire data;
processing circuitry configured to:
  independently determine, for a piece of the data acquired by each of the plurality of data acquirers, a second sequence number, and
  generate a plurality of first packets, each of which including a first header, a second header and the piece of the data, the first header including one of first sequence numbers assigned to the plurality of first packets, the second header including the second sequence number assigned to the piece of the data and an identifier that identifies at least one of a data acquirer having acquired the piece of the data or an application corresponding to the piece of the data; and
communication circuitry configured to:
  transmit the plurality of first packets, and
  receive a retransmission request for the piece of the data to which the second sequence number is assigned, wherein the processing circuitry is configured to generate, in response to the retransmission request, a second packet and a third packet, the second packet including a first header, two second headers, a piece of retransmission requested data and a piece of first data different from the piece of retransmission requested data, the first header in the second packet including a first sequence number different from the first sequence number included in a first packet including the piece of retransmission requested data, one of the two second headers in the second packet including (i) a second sequence number which is the same as the second sequence number included in the first packet including the piece of retransmission requested data, and (ii) an identifier which is the same as the identifier included in the first packet including the piece of retransmission requested data, the other of the two second headers in the second packet including (i) a second sequence number assigned to the piece of the first data which is different from the second sequence number included in the first packet including the piece of retransmission requested data and (ii) a first identifier different from the identifier included in the first packet including the piece of retransmission requested data, and the third packet including a first header, two second headers, the piece of retransmission requested data and a piece of second data different from the piece of retransmission requested data, the first header in the third packet including a first sequence number different from the first sequence number included in the first packet including the piece of retransmission requested data, one of the two second headers in the third packet a including (i) a second sequence number which is the same as the second sequence number included in the first packet including the piece of retransmission requested data and (ii) an identifier which is the same as the identifier included in the first packet including the piece of retransmission requested data, and the other of the two second headers in the third packet including (i) a second sequence number which is assigned to the piece of the second data and is different from the second sequence number included in the first packet including the piece of retransmission requested data (ii) a second identifier being an identifier which is different from the identifier included in the first packet including the piece of retransmission requested data and is different from the first identifier, and the communication circuitry is configured to transmit the second packet and the third packet in parallel, thereby making transmission of the piece of retransmission requested data redundant.

2. The communication device according to claim 1, wherein the first header includes a first time stamp indicating a transmission time of a first packet including the first header.

3. The communication device according to claim 1, comprising:

buffer circuitry including a plurality of transmission buffers configured to buffer the data acquired by the plurality of data acquirers, wherein the processing circuitry is configured to:

read the piece of the data from each of the plurality of transmission buffers, generate each of the plurality of first packets including the read piece of the data and the one of the first sequence numbers, and control transmission of the data based on time constraints for the data buffered in the plurality of transmission buffers.

4. The communication device according to claim 3, wherein the communication circuitry is configured to receive information indicating a communication quality of a communication channel through which the plurality of first packets are transmitted, from another communication device that receives the plurality of first packets, and the processing circuitry is configured to control the transmission of the data based on the information.

5. The communication device according to claim 4, wherein when the information indicates that the communication quality is low, the processing circuitry is configured to:

replicate the piece of the data read from one of the plurality of transmission buffers that buffer the piece of the data having a high priority for a transmission, and generate a fourth packet including the replicated data, and the communication circuitry is configured to transmit a fifth packet including the piece of the data having the high priority read from the one of the plurality of transmission buffers and the fourth packet including the replicated data.

6. The communication device according to claim 5, wherein the communication circuitry includes first transmitting circuitry and second transmitting circuitry, one of the first transmitting circuitry or the second transmitting circuitry is configured to transmit the fifth packet including the piece of the data having the high priority, and the other of the first transmitting circuitry or the second transmitting circuitry is configured to transmit the fourth packet including the replicated data.

7. The communication device according to claim 1, wherein a communication protocol for the first header and a communication protocol for the second header are protocols that are upper than an IP or an UDP.

8. The communication device according to claim 1, wherein the plurality of data acquirers are configured to acquire the data from a plurality of sensors.

9. The communication device according to claim 8, wherein the plurality of sensors are mounted on a vehicle.

10. The communication device according to claim 1, further comprising at least one antenna.

11. A communication device comprising:

data processing circuitry including a plurality of data processors configured to process data;

communication circuitry configured to receive, from another communication device, a plurality of packets, each of which includes a first header, a second header and a piece of the data, the first header including a first sequence number, the second header including an identifier that is used to identify one of the plurality of data processors and a second sequence number that is assigned to the piece of the data, the second sequence number being assigned independently for each data processor to which the piece of the data is to be provided; and processing circuitry configured to process packets received by the communication circuitry, the packets including a first packet, a second packet received after the first packet and a third packet received after the first packet, the first sequence number in the second packet is higher than the first sequence number in the first packet, the identifier included in the second packet is different from the identifier included in the first packet, the first sequence number included in the third packet is higher than the first sequence number included in the first packet, and the identifier included in the third packet is the same as the identifier included in the first packet, wherein the communication circuitry unsuccessfully receives the first packet and successfully receives the second packet and the third packet, the processing circuitry is configured to:

detect a loss of the first packet based on the first sequence number, detect a loss of the piece of the data included in the first packet and specify the second sequence number of the piece of the data included in the first packet based on the second sequence number included in the third packet, the communication circuitry is configured to transmit a retransmission request for the piece of the data included in the first packet based on the second sequence number of the piece of the data included in the first packet, to the another communication device, and even when a retransmitted packet including a piece of retransmission requested data is not yet received in the communication circuitry, the processing circuitry provides the piece of the data in the second packet to the data processor corresponding to the data processor identified by the identifier in the second packet, and does not provide the piece of the data in the third packet to the data processor corresponding to the data processor identified by the identifier in the third packet before the retransmitted packet is received in the communication circuitry.

12. The communication device according to claim 11, wherein the first header of one of the plurality of packets includes a first time stamp indicating a transmission time of the one of the plurality of packets, the processing circuitry is configured to detect fluctuation information of delay times of the plurality of packets, based on the first time stamp included in the first header of the one of the plurality of packets and a receipt time of the one of the plurality of packets, and the communication circuitry is configured to transmit the fluctuation information to the another communication device that transmits the plurality of packets.

13. The communication device according to claim 11, further comprising at least one antenna.

14. The communication device according to claim 11, wherein the processing circuitry is configured to generate information based on the loss of the first packet, and the communication circuitry is configured to transmit the information generated based on the loss of the first packet, to the another communication device.

15. The communication device according to claim 14, wherein the information generated based on the loss of the first packet includes information of at least one of the first sequence number for which the loss of the first packet has occurred, a packet loss rate, or a communication quality.

16. A communication method that is executed by a communication device, comprising:

independently determining, for a piece of data acquired by each of a plurality of data acquirers, a second sequence number, and generating a plurality of first packets, each of which including a first header, a second header and the piece of the data, the first header including one of first sequence numbers assigned to the plurality of first packets, the second header including the second sequence number assigned to the piece of the data and an identifier that identifies at least one of a data acquirer having acquired the piece of the data or an application corresponding to the piece of the data;

transmitting the plurality of first packets;

receiving a retransmission request for the piece of the data to which the second sequence number is assigned;

generating, in response to the retransmission request, a second packet and a third packet, the second packet including a first header, two second headers, a piece of retransmission requested data and a piece of first data different from the piece of retransmission requested data, the first header in the second packet including a first sequence number different from the first sequence number included in a first packet including the piece of retransmission requested data, one of the two second headers in the second packet including (i) a second sequence number which is the same as the second sequence number included in the first packet including the piece of retransmission requested data, and (ii) an identifier which is the same as the identifier included in the first packet including the piece of retransmission requested data, and the other of the two second headers in the second packet including (i) a second sequence number which is assigned to the piece of the first data and is different from the second sequence number included in the first packet including the piece of retransmission requested data and (ii) a first identifier different from the identifier included in the first packet including the piece of retransmission requested data, and the third packet including a first header, two second headers, the piece of retransmission requested data and a piece of second data different from the piece of retransmission requested data, the first header in the third packet including a first sequence number different from the first sequence number included in the first packet including the piece of retransmission requested data, one of the two second headers in the third packet including (i) a second sequence number which is the same as the second sequence number included in the first packet including the piece of retransmission requested data and (ii) an identifier which is the same as the identifier included in the first packet including the piece of retransmission requested data, and the other of the two second headers in the third packet including (i) a second sequence number which is assigned to the piece of the second data and is different from the second sequence number included in the first packet including the piece of retransmission requested data (ii) a second identifier which is different from the identifier included in the first packet including the piece of retransmission requested data and is also different from the first identifier, and transmitting the second packet and the third packet in parallel, thereby making transmission of the piece of retransmission requested data redundant.

17. The communication method according to claim 16, wherein
the first header includes a first time stamp indicating a transmission time of a first packet including the first header.

18. The communication method according to claim 16, comprising:
buffering the data acquired by the plurality of data acquirers, in a plurality of transmission buffers in buffer circuitry;
reading the piece of the data from each of the plurality of transmission buffers;
generating each of the plurality of first packets including the read piece of the data and the one of the first sequence numbers; and
controlling transmission of the data based on time constraints for the data buffered in the plurality of transmission buffers.

* * * * *